(12) United States Patent
Mercer

(10) Patent No.: US 8,527,861 B2
(45) Date of Patent: Sep. 3, 2013

(54) METHODS AND APPARATUSES FOR DISPLAY AND TRAVERSING OF LINKS IN PAGE CHARACTER ARRAY

(75) Inventor: Paul Mercer, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 763 days.

(21) Appl. No.: 11/735,293

(22) Filed: Apr. 13, 2007

(65) Prior Publication Data

US 2007/0186148 A1    Aug. 9, 2007

Related U.S. Application Data

(63) Continuation of application No. 10/443,683, filed on May 22, 2003, now abandoned, which is a continuation of application No. 09/734,223, filed on Aug. 13, 1999, now abandoned.

(51) Int. Cl.
*G06F 17/00* (2006.01)
(52) U.S. Cl.
USPC .......................................... 715/206; 715/200
(58) Field of Classification Search
USPC ............... 715/206–208, 234, 238, 760, 200
See application file for complete search history.

(56) References Cited

U.S. PATENT DOCUMENTS

| 4,974,191 | A | 11/1990 | Amirghodsi et al. |
| 5,128,672 | A | 7/1992 | Kaehler |

(Continued)

FOREIGN PATENT DOCUMENTS

| DE | 198 41 541 B4 | 12/2007 |
| EP | 1245023 A1 | 10/2002 |

(Continued)

OTHER PUBLICATIONS

Rob Barrett, et al., 1997, "How to personalize the Web" in Proceedings of the ACM SIGCHI Conference on Human factors in computing systems (CHI '97) ACM, New York, NY, USA, p. 75-82.*

(Continued)

*Primary Examiner* — Amelia Rutledge
(74) *Attorney, Agent, or Firm* — Morgan, Lewis & Bockius LLP

(57) ABSTRACT

A method for processing a page character array finds links and creates link groups containing adjacent link characters. Adjacency of link characters is preferably defined as characters which are separated by any combination of no characters, blank space characters, line feed characters, or separator characters, such as vertical or horizontal separator bars or other separator characters. Once link groups have been defined, the method lays out each link group for display in an optimized form. Links are displayed as buttons. An optimized form of display includes centering all the buttons in a vertical list. Another optimized form of display includes laying out the link group as a rectangular matrix of buttons. According to another aspect, each of the links in a link group are logically mapped to a distinct user input, such as a key or voice command. The logical mapping aspect and optimized display aspect are optionally combined for certain types of hardware. For example, if keys are physically adjacent to any part of the display, the links are displayed near the keys, or in horizontal and/or vertical alignment with the keys, so that the key to which a link is mapped is apparent from its position on the display screen. As another example, the name of key or command to which a link is mapped is displayed within or beside the button containing the name of the link.

13 Claims, 18 Drawing Sheets

700

| User Input | Traverse |
|---|---|
| 1 KEY | LINK (A) |
| 2 KEY | LINK (B) |
| 3 KEY | LINK (C) |
| 4 KEY | LINK (D) |
| 5 KEY | LINK (E) |
| 6 KEY | LINK (F) |
| 7 KEY | LINK (G) |
| 8 KEY | LINK (H) |
| 9 KEY | LINK (I) |

(56) References Cited

U.S. PATENT DOCUMENTS

| | | | |
|---|---|---|---|
| 5,282,265 A | 1/1994 | Rohra Suda et al. | |
| 5,303,406 A | 4/1994 | Hansen et al. | |
| 5,386,556 A | 1/1995 | Hedin et al. | |
| 5,434,777 A | 7/1995 | Luciw | |
| 5,479,488 A | 12/1995 | Lenning et al. | |
| 5,577,241 A | 11/1996 | Spencer | |
| 5,608,624 A | 3/1997 | Luciw | |
| 5,682,539 A | 10/1997 | Conrad et al. | |
| 5,727,950 A | 3/1998 | Cook et al. | |
| 5,748,974 A | 5/1998 | Johnson | |
| 5,794,050 A | 8/1998 | Dahlgren et al. | |
| 5,826,261 A | 10/1998 | Spencer | |
| 5,848,410 A | 12/1998 | Walls et al. | 707/4 |
| 5,877,757 A | 3/1999 | Baldwin et al. | 345/336 |
| 5,895,466 A | 4/1999 | Goldberg et al. | |
| 5,899,972 A | 5/1999 | Miyazawa et al. | |
| 5,905,498 A | 5/1999 | Diament | 345/356 |
| 5,915,001 A | 6/1999 | Uppaluru | 379/88.22 |
| 5,915,249 A | 6/1999 | Spencer | |
| 5,937,163 A | 8/1999 | Lee et al. | 709/218 |
| 5,963,208 A | 10/1999 | Dolan et al. | 345/760 |
| 5,963,964 A | 10/1999 | Nielsen | 715/255 |
| 5,987,404 A | 11/1999 | Della Pietra et al. | |
| 6,029,135 A | 2/2000 | Krasle | 704/275 |
| 6,052,656 A | 4/2000 | Suda et al. | |
| 6,081,750 A | 6/2000 | Hoffberg et al. | |
| 6,088,731 A | 7/2000 | Kiraly et al. | |
| 6,138,158 A | 10/2000 | Boyle et al. | 709/225 |
| 6,144,938 A | 11/2000 | Surace et al. | |
| 6,188,999 B1 | 2/2001 | Moody | |
| 6,212,564 B1 | 4/2001 | Harter et al. | 709/228 |
| 6,226,655 B1 | 5/2001 | Borman et al. | 715/205 |
| 6,233,559 B1 | 5/2001 | Balakrishnan | |
| 6,246,981 B1 | 6/2001 | Papineni et al. | |
| 6,300,947 B1 * | 10/2001 | Kanevsky | 715/866 |
| 6,317,594 B1 | 11/2001 | Gossman et al. | |
| 6,317,831 B1 | 11/2001 | King | |
| 6,321,092 B1 | 11/2001 | Fitch et al. | |
| 6,334,103 B1 | 12/2001 | Surace et al. | |
| 6,400,806 B1 | 6/2002 | Uppaluru | 379/883.02 |
| 6,405,238 B1 | 6/2002 | Votipka | 709/203 |
| 6,417,873 B1 | 7/2002 | Fletcher et al. | 345/853 |
| 6,421,672 B1 | 7/2002 | McAllister et al. | |
| 6,434,524 B1 | 8/2002 | Weber | |
| 6,446,076 B1 | 9/2002 | Burkey et al. | |
| 6,453,292 B2 | 9/2002 | Ramaswamy et al. | |
| 6,466,654 B1 | 10/2002 | Cooper et al. | |
| 6,499,013 B1 | 12/2002 | Weber | |
| 6,501,937 B1 | 12/2002 | Ho et al. | |
| 6,513,063 B1 | 1/2003 | Julia et al. | |
| 6,523,061 B1 | 2/2003 | Halverson et al. | |
| 6,526,395 B1 | 2/2003 | Morris | |
| 6,532,444 B1 | 3/2003 | Weber | |
| 6,532,446 B1 | 3/2003 | King | |
| 6,598,039 B1 | 7/2003 | Livowsky | |
| 6,601,026 B2 | 7/2003 | Appelt et al. | |
| 6,604,059 B2 | 8/2003 | Strubbe et al. | |
| 6,615,172 B1 | 9/2003 | Bennett et al. | |
| 6,633,846 B1 | 10/2003 | Bennett et al. | |
| 6,647,260 B2 | 11/2003 | Dusse et al. | |
| 6,650,735 B2 | 11/2003 | Burton et al. | |
| 6,665,639 B2 | 12/2003 | Mozer et al. | |
| 6,665,640 B1 | 12/2003 | Bennett et al. | |
| 6,691,111 B2 | 2/2004 | Lazaridis et al. | |
| 6,691,151 B1 | 2/2004 | Cheyer et al. | |
| 6,735,632 B1 | 5/2004 | Kiraly et al. | |
| 6,742,021 B1 | 5/2004 | Halverson et al. | |
| 6,757,362 B1 | 6/2004 | Cooper et al. | |
| 6,757,718 B1 | 6/2004 | Halverson et al. | |
| 6,772,394 B1 | 8/2004 | Kamada | 715/210 |
| 6,778,951 B1 | 8/2004 | Contractor | |
| 6,792,082 B1 | 9/2004 | Levine | |
| 6,807,574 B1 | 10/2004 | Partovi et al. | |
| 6,810,379 B1 | 10/2004 | Vermeulen et al. | |
| 6,813,491 B1 | 11/2004 | McKinney | |
| 6,832,194 B1 | 12/2004 | Mozer et al. | |
| 6,842,767 B1 | 1/2005 | Partovi et al. | |
| 6,851,115 B1 | 2/2005 | Cheyer et al. | |
| 6,859,931 B1 | 2/2005 | Cheyer et al. | |
| 6,895,380 B2 | 5/2005 | Sepe, Jr. | |
| 6,895,558 B1 | 5/2005 | Loveland | |
| 6,928,614 B1 | 8/2005 | Everhart | |
| 6,937,975 B1 | 8/2005 | Elworthy | |
| 6,952,799 B2 * | 10/2005 | Edwards et al. | 715/207 |
| 6,964,023 B2 | 11/2005 | Maes et al. | |
| 6,980,949 B2 | 12/2005 | Ford | |
| 6,985,865 B1 | 1/2006 | Packingham et al. | |
| 6,996,531 B2 | 2/2006 | Korall et al. | |
| 6,999,927 B2 | 2/2006 | Mozer et al. | |
| 7,020,685 B1 | 3/2006 | Chen et al. | |
| 7,027,974 B1 | 4/2006 | Busch et al. | |
| 7,036,128 B1 | 4/2006 | Julia et al. | |
| 7,050,977 B1 | 5/2006 | Bennett | |
| 7,062,428 B2 | 6/2006 | Hogenhout et al. | |
| 7,069,560 B1 | 6/2006 | Cheyer et al. | |
| 7,092,887 B2 | 8/2006 | Mozer et al. | |
| 7,092,928 B1 | 8/2006 | Elad et al. | |
| 7,127,046 B1 | 10/2006 | Smith et al. | |
| 7,136,710 B1 | 11/2006 | Hoffberg et al. | |
| 7,137,126 B1 | 11/2006 | Coffman et al. | |
| 7,139,714 B2 | 11/2006 | Bennett et al. | |
| 7,139,722 B2 | 11/2006 | Perrella et al. | |
| 7,177,798 B2 | 2/2007 | Hsu et al. | |
| 7,197,460 B1 | 3/2007 | Gupta et al. | |
| 7,200,559 B2 | 4/2007 | Wang | |
| 7,203,646 B2 | 4/2007 | Bennett | |
| 7,216,073 B2 | 5/2007 | Lavi et al. | |
| 7,216,080 B2 | 5/2007 | Tsiao et al. | |
| 7,225,125 B2 | 5/2007 | Bennett et al. | |
| 7,233,790 B2 | 6/2007 | Kjellberg et al. | |
| 7,233,904 B2 | 6/2007 | Luisi | |
| 7,266,496 B2 | 9/2007 | Wang et al. | |
| 7,277,854 B2 | 10/2007 | Bennett et al. | |
| 7,290,039 B1 | 10/2007 | Lisitsa et al. | |
| 7,299,033 B2 | 11/2007 | Kjellberg et al. | |
| 7,310,600 B1 | 12/2007 | Garner et al. | |
| 7,324,947 B2 | 1/2008 | Jordan et al. | |
| 7,349,953 B2 | 3/2008 | Lisitsa et al. | |
| 7,376,556 B2 | 5/2008 | Bennett | |
| 7,376,645 B2 | 5/2008 | Bernard | |
| 7,379,874 B2 | 5/2008 | Schmid et al. | |
| 7,386,449 B2 | 6/2008 | Sun et al. | |
| 7,392,185 B2 | 6/2008 | Bennett | |
| 7,398,209 B2 | 7/2008 | Kennewick et al. | |
| 7,403,938 B2 | 7/2008 | Harrison et al. | |
| 7,409,337 B1 | 8/2008 | Potter et al. | |
| 7,415,100 B2 | 8/2008 | Cooper et al. | |
| 7,418,392 B1 | 8/2008 | Mozer et al. | |
| 7,426,467 B2 | 9/2008 | Nashida et al. | |
| 7,447,635 B1 | 11/2008 | Konopka et al. | |
| 7,454,351 B2 | 11/2008 | Jeschke et al. | |
| 7,467,087 B1 | 12/2008 | Gillick et al. | |
| 7,475,010 B2 | 1/2009 | Chao | |
| 7,483,894 B2 | 1/2009 | Cao | |
| 7,487,089 B2 | 2/2009 | Mozer | |
| 7,496,498 B2 | 2/2009 | Chu et al. | |
| 7,496,512 B2 | 2/2009 | Zhao et al. | |
| 7,502,738 B2 | 3/2009 | Kennewick et al. | |
| 7,508,373 B2 | 3/2009 | Lin et al. | |
| 7,522,927 B2 | 4/2009 | Fitch et al. | |
| 7,523,108 B2 | 4/2009 | Cao | |
| 7,526,466 B2 | 4/2009 | Au | |
| 7,529,671 B2 | 5/2009 | Rockenbeck et al. | |
| 7,529,676 B2 | 5/2009 | Koyama | |
| 7,539,656 B2 | 5/2009 | Fratkina et al. | |
| 7,546,382 B2 | 6/2009 | Healey et al. | |
| 7,548,895 B2 | 6/2009 | Pulsipher | |
| 7,555,431 B2 | 6/2009 | Bennett | |
| 7,571,106 B2 | 8/2009 | Cao et al. | |
| 7,599,918 B2 | 10/2009 | Shen et al. | |
| 7,620,549 B2 | 11/2009 | Di Cristo et al. | |
| 7,624,007 B2 | 11/2009 | Bennett | |
| 7,634,409 B2 | 12/2009 | Kennewick et al. | |
| 7,636,657 B2 | 12/2009 | Ju et al. | |

| | | | | | |
|---|---|---|---|---|---|
| 7,640,160 B2 | 12/2009 | Di Cristo et al. | 2005/0080625 A1 | 4/2005 | Bennett et al. |
| 7,647,225 B2 | 1/2010 | Bennett et al. | 2005/0119897 A1 | 6/2005 | Bennett et al. |
| 7,657,424 B2 | 2/2010 | Bennett | 2005/0143972 A1 | 6/2005 | Gopalakrishnan et al. |
| 7,672,841 B2 | 3/2010 | Bennett | 2006/0018492 A1 | 1/2006 | Chiu et al. |
| 7,676,026 B1 | 3/2010 | Baxter, Jr. | 2006/0122834 A1 | 6/2006 | Bennett |
| 7,684,985 B2 | 3/2010 | Dominach et al. | 2006/0143007 A1 | 6/2006 | Koh et al. |
| 7,693,715 B2 | 4/2010 | Hwang et al. | 2007/0055529 A1 | 3/2007 | Kanevsky et al. |
| 7,693,720 B2 | 4/2010 | Kennewick et al. | 2007/0058832 A1 | 3/2007 | Hug et al. |
| 7,698,131 B2 | 4/2010 | Bennett | 2007/0088556 A1 | 4/2007 | Andrew |
| 7,702,500 B2 | 4/2010 | Blaedow | 2007/0100790 A1 | 5/2007 | Cheyer et al. |
| 7,702,508 B2 | 4/2010 | Bennett | 2007/0118377 A1 | 5/2007 | Badino et al. |
| 7,707,027 B2 | 4/2010 | Balchandran et al. | 2007/0174188 A1 | 7/2007 | Fish |
| 7,707,032 B2 | 4/2010 | Wang et al. | 2007/0185917 A1 | 8/2007 | Prahlad et al. |
| 7,707,267 B2 | 4/2010 | Lisitsa et al. | 2007/0282595 A1 | 12/2007 | Tunning et al. |
| 7,711,672 B2 | 5/2010 | Au | 2008/0015864 A1 | 1/2008 | Ross et al. |
| 7,716,056 B2 | 5/2010 | Weng et al. | 2008/0021708 A1 | 1/2008 | Bennett et al. |
| 7,720,674 B2 | 5/2010 | Kaiser et al. | 2008/0034032 A1 | 2/2008 | Healey et al. |
| 7,720,683 B1 | 5/2010 | Vermeulen et al. | 2008/0052063 A1 | 2/2008 | Bennett et al. |
| 7,725,307 B2 | 5/2010 | Bennett | 2008/0120112 A1 | 5/2008 | Jordan et al. |
| 7,725,318 B2 | 5/2010 | Gavalda et al. | 2008/0129520 A1 | 6/2008 | Lee |
| 7,725,320 B2 | 5/2010 | Bennett | 2008/0140657 A1 | 6/2008 | Azvine et al. |
| 7,725,321 B2 | 5/2010 | Bennett | 2008/0221903 A1 | 9/2008 | Kanevsky et al. |
| 7,729,904 B2 | 6/2010 | Bennett | 2008/0228496 A1 | 9/2008 | Yu et al. |
| 7,729,916 B2 | 6/2010 | Coffman et al. | 2008/0247519 A1 | 10/2008 | Abella et al. |
| 7,734,461 B2 | 6/2010 | Kwak et al. | 2008/0249770 A1 | 10/2008 | Kim et al. |
| 7,752,152 B2 | 7/2010 | Paek et al. | 2008/0300878 A1 | 12/2008 | Bennett |
| 7,774,204 B2 | 8/2010 | Mozer et al. | 2009/0006100 A1 | 1/2009 | Badger et al. |
| 7,783,486 B2 | 8/2010 | Rosser et al. | 2009/0006343 A1 | 1/2009 | Platt et al. |
| 7,801,729 B2 | 9/2010 | Mozer | 2009/0030800 A1 | 1/2009 | Grois |
| 7,809,570 B2 | 10/2010 | Kennewick et al. | 2009/0058823 A1 | 3/2009 | Kocienda |
| 7,809,610 B2 | 10/2010 | Cao | 2009/0076796 A1 | 3/2009 | Daraselia |
| 7,818,176 B2 | 10/2010 | Freeman et al. | 2009/0100049 A1 | 4/2009 | Cao |
| 7,822,608 B2 | 10/2010 | Cross, Jr. et al. | 2009/0112677 A1 | 4/2009 | Rhett |
| 7,826,945 B2 | 11/2010 | Zhang et al. | 2009/0150156 A1 | 6/2009 | Kennewick et al. |
| 7,831,426 B2 | 11/2010 | Bennett | 2009/0157401 A1 | 6/2009 | Bennett |
| 7,840,400 B2 | 11/2010 | Lavi et al. | 2009/0164441 A1 | 6/2009 | Cheyer |
| 7,840,447 B2 | 11/2010 | Kleinrock et al. | 2009/0171664 A1 | 7/2009 | Kennewick et al. |
| 7,873,519 B2 | 1/2011 | Bennett | 2009/0290718 A1 | 11/2009 | Kahn et al. |
| 7,873,654 B2 | 1/2011 | Bernard | 2009/0299745 A1 | 12/2009 | Kennewick et al. |
| 7,881,936 B2 | 2/2011 | Longé et al. | 2009/0299849 A1 | 12/2009 | Cao et al. |
| 7,912,702 B2 | 3/2011 | Bennett | 2010/0005081 A1 | 1/2010 | Bennett |
| 7,917,367 B2 | 3/2011 | Di Cristo et al. | 2010/0023320 A1 | 1/2010 | Di Cristo et al. |
| 7,917,497 B2 | 3/2011 | Harrison et al. | 2010/0036660 A1 | 2/2010 | Bennett |
| 7,920,678 B2 | 4/2011 | Cooper et al. | 2010/0042400 A1 | 2/2010 | Block et al. |
| 7,925,525 B2 | 4/2011 | Chin | 2010/0088020 A1 | 4/2010 | Sano et al. |
| 7,930,168 B2 | 4/2011 | Weng et al. | 2010/0145700 A1 | 6/2010 | Kennewick et al. |
| 7,949,529 B2 | 5/2011 | Weider et al. | 2010/0204986 A1 | 8/2010 | Kennewick et al. |
| 7,974,844 B2 | 7/2011 | Sumita | 2010/0217604 A1 | 8/2010 | Baldwin et al. |
| 7,974,972 B2 | 7/2011 | Cao | 2010/0228540 A1 | 9/2010 | Bennett |
| 7,983,915 B2 | 7/2011 | Knight et al. | 2010/0235341 A1 | 9/2010 | Bennett |
| 7,983,917 B2 | 7/2011 | Kennewick et al. | 2010/0257160 A1 | 10/2010 | Cao |
| 7,983,997 B2 | 7/2011 | Allen et al. | 2010/0277579 A1 | 11/2010 | Cho et al. |
| 7,987,151 B2 | 7/2011 | Schott et al. | 2010/0280983 A1 | 11/2010 | Cho et al. |
| 8,000,453 B2 | 8/2011 | Cooper et al. | 2010/0286985 A1 | 11/2010 | Kennewick et al. |
| 8,005,679 B2 | 8/2011 | Jordan et al. | 2010/0299142 A1 | 11/2010 | Freeman et al. |
| 8,015,006 B2 | 9/2011 | Kennewick et al. | 2010/0312547 A1 | 12/2010 | van Os et al. |
| 8,024,195 B2 | 9/2011 | Mozer et al. | 2010/0318576 A1 | 12/2010 | Kim |
| 8,036,901 B2 | 10/2011 | Mozer | 2010/0332235 A1 | 12/2010 | David |
| 8,041,570 B2 | 10/2011 | Mirkovic et al. | 2010/0332348 A1 | 12/2010 | Cao |
| 8,041,611 B2 | 10/2011 | Kleinrock et al. | 2011/0060807 A1 | 3/2011 | Martin et al. |
| 8,055,708 B2 | 11/2011 | Chitsaz et al. | 2011/0082688 A1 | 4/2011 | Kim et al. |
| 8,069,046 B2 | 11/2011 | Kennewick et al. | 2011/0112827 A1 | 5/2011 | Kennewick et al. |
| 8,073,681 B2 | 12/2011 | Baldwin et al. | 2011/0112921 A1 | 5/2011 | Kennewick et al. |
| 8,082,153 B2 | 12/2011 | Coffman et al. | 2011/0119049 A1 | 5/2011 | Ylonen |
| 8,095,364 B2 | 1/2012 | Longé et al. | 2011/0125540 A1 | 5/2011 | Jang et al. |
| 8,099,289 B2 | 1/2012 | Mozer et al. | 2011/0130958 A1 | 6/2011 | Stahl et al. |
| 8,107,401 B2 | 1/2012 | John et al. | 2011/0131036 A1 | 6/2011 | Di Cristo et al. |
| 8,112,275 B2 | 2/2012 | Kennewick et al. | 2011/0131045 A1 | 6/2011 | Cristo et al. |
| 8,112,280 B2 | 2/2012 | Lu | 2011/0144999 A1 | 6/2011 | Jang et al. |
| 8,140,335 B2 | 3/2012 | Kennewick et al. | 2011/0161076 A1 | 6/2011 | Davis et al. |
| 8,165,886 B1 | 4/2012 | Gagnon et al. | 2011/0175810 A1 | 7/2011 | Markovic et al. |
| 8,166,019 B1 | 4/2012 | Lee et al. | 2011/0184730 A1 | 7/2011 | LeBeau et al. |
| 8,190,359 B2 | 5/2012 | Bourne | 2011/0218855 A1 | 9/2011 | Cao et al. |
| 8,195,467 B2 | 6/2012 | Mozer et al. | 2011/0231182 A1 | 9/2011 | Weider et al. |
| 8,204,238 B2 | 6/2012 | Mozer | 2011/0231188 A1 | 9/2011 | Kennewick et al. |
| 8,219,407 B1 | 7/2012 | Roy et al. | 2011/0264643 A1 | 10/2011 | Cao |
| 2002/0069063 A1 | 6/2002 | Buchner et al. | 2011/0279368 A1 | 11/2011 | Klein et al. |
| 2004/0135701 A1 | 7/2004 | Yasuda et al. | 2011/0306426 A1 | 12/2011 | Novak et al. |
| 2005/0071332 A1 | 3/2005 | Ortega et al. | 2012/0002820 A1 | 1/2012 | Leichter |

| | | | |
|---|---|---|---|
| 2012/0016678 A1 | 1/2012 | Gruber et al. | |
| 2012/0020490 A1 | 1/2012 | Leichter | |
| 2012/0022787 A1 | 1/2012 | LeBeau et al. | |
| 2012/0022857 A1 | 1/2012 | Baldwin et al. | |
| 2012/0022860 A1 | 1/2012 | Lloyd et al. | |
| 2012/0022868 A1 | 1/2012 | LeBeau et al. | |
| 2012/0022869 A1 | 1/2012 | Lloyd et al. | |
| 2012/0022870 A1 | 1/2012 | Kristjansson et al. | |
| 2012/0022874 A1 | 1/2012 | Lloyd et al. | |
| 2012/0022876 A1 | 1/2012 | LeBeau et al. | |
| 2012/0023088 A1 | 1/2012 | Cheng et al. | |
| 2012/0034904 A1 | 2/2012 | LeBeau et al. | |
| 2012/0035908 A1 | 2/2012 | LeBeau et al. | |
| 2012/0035924 A1 | 2/2012 | Jitkoff et al. | |
| 2012/0035931 A1 | 2/2012 | LeBeau et al. | |
| 2012/0035932 A1 | 2/2012 | Jitkoff et al. | |
| 2012/0042343 A1 | 2/2012 | Laligand et al. | |
| 2012/0271676 A1 | 10/2012 | Aravamudan et al. | |

FOREIGN PATENT DOCUMENTS

| | | | |
|---|---|---|---|
| JP | 06 019965 | | 1/1994 |
| JP | 2001 125896 | | 5/2001 |
| JP | 2002 024212 | | 1/2002 |
| JP | 2003517158 | A | 5/2003 |
| JP | 2009 036999 | | 2/2009 |
| KR | 10-0776800 | B1 | 11/2007 |
| KR | 10-0810500 | B1 | 3/2008 |
| KR | 10 2008 109322 | A | 12/2008 |
| KR | 10 2009 086805 | A | 8/2009 |
| KR | 10-0920267 | B1 | 10/2009 |
| KR | 10 2011 0113414 | A | 10/2011 |
| WO | WO97/49044 | * | 12/1997 |
| WO | WO 2006/129967 | A1 | 12/2006 |
| WO | WO 2011/088053 | A2 | 7/2011 |

OTHER PUBLICATIONS

Netscape 3.01 history screendumps, 5 pages (1996).
Bussler, C., et al., "Web Service Execution Environment (WSMX)," Jun. 3, 2005, W3C Member Submission, http://www.w3.org/Submission/WSMX, 29 pages.
Cheyer, A., "About Adam Cheyer," Sep. 17, 2012, http://www.adam.cheyer.com/about.html, 2 pages.
Cheyer, A., "A Perspective on AI & Agent Technologies for SCM," VerticalNet, 2001 presentation, 22 pages.
Domingue, J., et al., "Web Service Modeling Ontology (WSMO)—An Ontology for Semantic Web Services," Jun. 9-10, 2005, position paper at the W3C Workshop on Frameworks for Semantics in Web Services, Innsbruck, Austria, 6 pages.
Guzzoni, D., et al., "A Unified Platform for Building Intelligent Web Interaction Assistants," Proceedings of the 2006 IEEE/WIC/ACM International Conference on Web Intelligence and Intelligent Agent Technology, Computer Society, 4 pages.
Roddy, D., et al., "Communication and Collaboration in a Landscape of B2B eMarketplaces," VerticalNet Solutions, white paper, Jun. 15, 2000, 23 pages.
Glass, J., et al., "Multilingual Spoken-Language Understanding in the MIT Voyager System," Aug. 1995, http://groups.csail.mit.edu/sls/publications/1995/speechcomm95-voyager.pdf, 29 pages.
Goddeau, D., et al., "A Form-Based Dialogue Manager for Spoken Language Applications," Oct. 1996, http://phasedance.com/pdf/icslp96.pdf, 4 pages.
Goddeau, D., et al., "Galaxy: A Human-Language Interface to On-Line Travel Information," 1994 International Conference on Spoken Language Processing, Sep. 18-22, 1994, Pacific Convention Plaza Yokohama, Japan, 6 pages.
Meng, H., et al., "Wheels: A Conversational System in the Automobile Classified Domain," Oct. 1996, httphttp://citeseerx.ist.psu.edu/viewdoc/summary?doi=10.1.1.16.3022, 4 pages.
*Phoenix Solutions, Inc.* v. *West Interactive Corp.*, Document 40, Declaration of Christopher Schmandt Regarding the MIT Galaxy System dated Jul. 2, 2010, 162 pages.
Seneff, S., et al., "A New Restaurant Guide Conversational System: Issues in Rapid Prototyping for Specialized Domains," Oct. 1996, citeseerx.ist.psu.edu/viewdoc/download?doi=10.1.1.16...rep..., 4 pages.

Vlingo InCar, "Distracted Driving Solution with Vlingo InCar," 2:38 minute video uploaded to YouTube by Vlingo Voice on Oct. 6, 2010, http://www.youtube.com/watch?v=Vqs8XfXxgz4, 2 pages.
Zue, V., "Conversational Interfaces: Advances and Challenges," Sep. 1997, http://www.cs.cmu.edu/~dod/papers/zue97.pdf, 10 pages.
Zue, V. W., "Toward Systems that Understand Spoken Language," Feb. 1994, ARPA Strategic Computing Institute, ©1994 IEEE, 9 pages.
Martin, D., et al., "The Open Agent Architecture: A Framework for building distributed software systems," Jan.-Mar. 1999, Applied Artificial Intelligence: An International Journal, vol. 13, No. 1-2, http://adam.cheyer.com/papers/oaa.pdf, 38 pages.
Alfred App, 2011, http://www.alfredapp.com/, 5 pages.
Ambite, JL., et al., "Design and Implementation of the CALO Query Manager," Copyright © 2006, American Association for Artificial Intelligence, (www.aaai.org), 8 pages.
Ambite, JL., et al., "Integration of Heterogeneous Knowledge Sources in the CALO Query Manager," 2005, The 4th International Conference on Ontologies, DataBases, and Applications of Semantics (ODBASE), Agia Napa, Cyprus, ttp://www.isi.edu/people/ambite/publications/integration_heterogeneous_knowledge_sources_calo_query_manager, 18 pages.
Belvin, R. et al., "Development of the HRL Route Navigation Dialogue System," 2001, in Proceedings of the First International Conference on Human Language Technology Research, Paper, Copyright © 2001 HRL Laboratories, LLC, http://citeseerx.ist.psu.edu/viewdoc/summary?doi=10.1.1.10.6538, 5 pages.
Berry, P. M., et al. "PTIME: Personalized Assistance for Calendaring," ACM Transactions on Intelligent Systems and Technology, vol. 2, No. 4, Article 40, Publication date: Jul. 2011, 40:1-22, 22 pages.
Butcher, M., "EVI arrives in town to go toe-to-toe with Siri," Jan. 23, 2012, http://techcrunch.com/2012/01/23/evi-arrives-in-town-to-go-toe-to-toe-with-siri/, 2 pages.
Chen, Y., "Multimedia Siri Finds and Plays Whatever You Ask for," Feb. 9, 2012, http://www.psfk.com/2012/02/multimedia-siri.html, 9 pages.
Cheyer, A. et al., "Spoken Language and Multimodal Applications for Electronic Realties," © Springer-Verlag London Ltd, Virtual Reality 1999, 3:1-15, 15 pages.
Cutkosky, M. R. et al., "PACT: An Experiment in Integrating Concurrent Engineering Systems," Journal, Computer, vol. 26 Issue 1, Jan. 1993, IEEE Computer Society Press Los Alamitos, CA, USA, http://dl.acm.org/citation.cfm?id=165320, 14 pages.
Elio, R. et al., "On Abstract Task Models and Conversation Policies," http://webdocs.cs.ualberta.ca/~ree/publications/papers2/ATS.AA99.pdf, 10 pages.
Ericsson, S. et al., "Software illustrating a unified approach to multimodality and multilinguality in the in-home domain," Dec. 22, 2006, Talk and Look: Tools for Ambient Linguistic Knowledge, http://www.talk-project.eurice.eu/fileadmin/talk/publications_public/deliverables_public/D1_6.pdf, 127 pages.
Evi, "Meet Evi: the one mobile app that provides solutions for your everyday problems," Feb. 8, 2012, http://www.evi.com/, 3 pages.
Feigenbaum, E., et al., "Computer-assisted Semantic Annotation of Scientific Life Works," 2007, http://tomgruber.org/writing/stanford-cs300.pdf, 22 pages.
Gannes, L., "Alfred App Gives Personalized Restaurant Recommendations," allthingsd.com, Jul. 18, 2011, http://allthingsd.com/20110718/alfred-app-gives-personalized-restaurant-recommendations/, 3 pages.
Gautier, P. O., et al. "Generating Explanations of Device Behavior Using Compositional Modeling and Causal Ordering," 1993, http://citeseerx.ist.psu.edu/viewdoc/summary?doi=10.1.1.42.8394, 9 pages.
Gervasio, M. T., et al., Active Preference Learning for Personalized Calendar Scheduling Assistancae, Copyright © 2005, http://www.ai.sri.com/~gervasio/pubs/gervasio-iui05.pdf, 8 pages.
Glass, A., "Explaining Preference Learning," 2006, http://cs229.stanford.edu/proj2006/Glass-ExplainingPreferenceLearning.pdf, 5 pages.
Gruber, T. R., et al., "An Ontology for Engineering Mathematics," in Jon Doyle, Piero Torasso, & Erik Sandewall, Eds., Fourth International Conference on Principles of Knowledge Representation and Reasoning, Gustav Stresemann Institut, Bonn, Germany, Morgan Kaufmann, 1994, http://www-ksl.stanford.edu/knowledge-sharing/papers/engmath.html, 22 pages.

Gruber, T. R., "A Translation Approach to Portable Ontology Specifications," Knowledge Systems Laboratory, Stanford University, Sep. 1992, Technical Report KSL 92-71, Revised Apr. 1993, 27 pages.

Gruber, T. R., "Automated Knowledge Acquisition for Strategic Knowledge," Knowledge Systems Laboratory, Machine Learning, 4, 293-336 (1989), 44 pages.

Gruber, T. R., "(Avoiding) the Travesty of the Commons," Presentation at NPUC 2006, New Paradigms for User Computing, IBM Almaden Research Center, Jul. 24, 2006. http://tomgruber.org/writing/avoiding-travestry.htm, 52 pages.

Gruber, T. R., "Big Think Small Screen: How semantic computing in the cloud will revolutionize the consumer experience on the phone," Keynote presentation at Web 3.0 conference, Jan. 27, 2010, http://tomgruber.org/writing/web30jan2010.htm, 41 pages.

Gruber, T. R., "Collaborating around Shared Content on the WWW," W3C Workshop on WWW and Collaboration, Cambridge, MA, Sep. 11, 1995, http://www.w3.org/Collaboration/Workshop/Proceedings/P9.html, 1 page.

Gruber, T. R., "Collective Knowledge Systems: Where the Social Web meets the Semantic Web," Web Semantics: Science, Services and Agents on the World Wide Web (2007), doi:10.1016/j.websem.2007.11.011, keynote presentation given at the 5th International Semantic Web Conference, Nov. 7, 2006, 19 pages.

Gruber, T. R., "Where the Social Web meets the Semantic Web," Presentation at the 5th International Semantic Web Conference, Nov. 7, 2006, 38 pages.

Gruber, T. R., "Despite our Best Efforts, Ontologies are not the Problem," AAAI Spring Symposium, Mar. 2008, http://tomgruber.org/writing/aaai-ss08.htm, 40 pages.

Gruber, T. R., "Enterprise Collaboration Management with Intraspect," Intraspect Software, Inc., Instraspect Technical White Paper Jul. 2001, 24 pages.

Gruber, T. R., "Every ontology is a treaty—a social agreement—among people with some common motive in sharing," Interview by Dr. Miltiadis D. Lytras, Official Quarterly Bulletin of AIS Special Interest Group on Semantic Web and Information Systems, vol. 1, Issue 3, 2004, http://www.sigsemis.org 1, 5 pages.

Gruber, T. R., et al., "Generative Design Rationale: Beyond the Record and Replay Paradigm," Knowledge Systems Laboratory, Stanford University, Dec. 1991, Technical Report KSL 92-59, Updated Feb. 1993, 24 pages.

Gruber, T. R., "Helping Organizations Collaborate, Communicate, and Learn," Presentation to NASA Ames Research, Mountain View, CA, Mar. 2003, http://tomgruber.org/writing/organizational-intelligence-talk.htm, 30 pages.

Gruber, T. R., "Intelligence at the Interface: Semantic Technology and the Consumer Internet Experience," Presentation at Semantic Technologies conference (SemTech08), May 20, 2008, http://tomgruber.org/writing.htm, 40 pages.

Gruber, T. R., Interactive Acquisition of Justifications: Learning "Why" by Being Told "What" Knowledge Systems Laboratory, Stanford University, Oct. 1990, Technical Report KSL 91.17, Revised Feb. 1991, 24 pages.

Gruber, T. R., "It Is What It Does: The Pragmatics of Ontology for Knowledge Sharing," (c) 2000, 2003, http://www.cidoc-crm.org/docs/symposium_presentations/gruber_cidoc-ontology-2003.pdf, 21 pages.

Gruber, T. R., et al., "Machine-generated Explanations of Engineering Models: A Compositional Modeling Approach," (1993) in Proc. International Joint Conference on Artificial Intelligence, http://citeseerx.ist.psu.edu/viewdoc/summary?doi=10.1.1.34.930, 7 pages.

Gruber, T. R., "2021: Mass Collaboration and the Really New Economy," TNTY Futures, the newsletter of the Next Twenty Years series, vol. 1, Issue 6, Aug. 2001, http://www.tnty.com/newsletter/futures/archive/v01-05business.html, 5 pages.

Gruber, T. R., et al.,"NIKE: A National Infrastructure for Knowledge Exchange," Oct. 1994, http://www.eit.com/papers/nike/nike.html and nike.ps, 10 pages.

Gruber, T. R., "Ontologies, Web 2.0 and Beyond," Apr. 24, 2007, Ontology Summit 2007, http://tomgruber.org/writing/ontolog-social-web-keynote.pdf, 17 pages.

Gruber, T. R., "Ontology of Folksonomy: A Mash-up of Apples and Oranges," Originally published to the web in 2005, Int'l Journal on Semantic Web & Information Systems, 3(2), 2007, 7 pages.

Gruber, T. R., "Siri, a Virtual Personal Assistant—Bringing Intelligence to the Interface," Jun. 16, 2009, Keynote presentation at Semantic Technologies conference, Jun. 2009. http://tomgruber.org/writing/semtech09.htm, 22 pages.

Gruber, T. R., "TagOntology," Presentation to Tag Camp, www.tagcamp.org, Oct. 29, 2005, 20 pages.

Gruber, T. R., et al., "Toward a Knowledge Medium for Collaborative Product Development," in Artificial Intelligence in Design 1992, from Proceedings of the Second International Conference on Artificial Intelligence in Design, Pittsburgh, USA, Jun. 22-25, 1992, 19 pages.

Gruber, T. R., "Toward Principles for the Design of Ontologies Used for Knowledge Sharing," in International Journal Human-Computer Studies 43, p. 907-928, substantial revision of paper presented at the International Workshop on Formal Ontology, Mar. 1993, Padova, Italy, available as Technical Report KSL 93-04, Knowledge Systems Laboratory, Stanford University, further revised Aug. 23, 1993, 23 pages.

Guzzoni, D., et al., "Active, A Platform for Building Intelligent Operating Rooms," Surgetica 2007 Computer-Aided Medical Interventions: tools and applications, pp. 191-198, Paris, 2007, Sauramps Médical, http://lsro.epfl.ch/page-68384-en.html, 8 pages.

Guzzoni, D., et al., "Active, A Tool for Building Intelligent User Interfaces," ASC 2007, Palma de Mallorca, http://lsro.epfl.ch/page-34241.html, 6 pages.

Guzzoni, D., et al., "Modeling Human-Agent Interaction with Active Ontologies," 2007, AAAI Spring Symposium, Interaction Challenges for Intelligent Assistants, Stanford University, Palo Alto, California, 8 pages.

Hardawar, D., "Driving app Waze builds its own Siri for hands-free voice control," Feb. 9, 2012, http://venturebeat.com/2012/02/09/driving-app-waze-builds-its-own-siri-for-hands-free-voice-control/, 4 pages.

Intraspect Software, "The Intraspect Knowledge Management Solution: Technical Overview," http://tomgruber.org/writing/intraspect-whitepaper-1998.pdf, 18 pages.

Julia, L., et al., Un éditeur interactif de tableaux dessinés à main levée (An Interactive Editor for Hand-Sketched Tables), Traitement du Signal 1995, vol. 12, No. 6, 8 pages. No English Translation Available.

Karp, P. D., "A Generic Knowledge-Base Access Protocol," May 12, 1994, http://lecture.cs.buu.ac.th/~f50353/Document/gfp.pdf, 66 pages.

Lemon, O., et al., "Multithreaded Context for Robust Conversational Interfaces: Context-Sensitive Speech Recognition and Interpretation of Corrective Fragments," Sep. 2004, ACM Transactions on Computer-Human Interaction, vol. 11, No. 3, 27 pages.

Leong, L., et al., "CASIS: A Context-Aware Speech Interface System," IUI'05, Jan. 9-12, 2005, Proceedings of the 10th international conference on Intelligent user interfaces, San Diego, California, USA, 8 pages.

Lieberman, H., et al., "Out of context: Computer systems that adapt to, and learn from, context," 2000, IBM Systems Journal, vol. 39, Nos. 3/4, 2000, 16 pages.

Lin, B., et al., "A Distributed Architecture for Cooperative Spoken Dialogue Agents with Coherent Dialogue State and History," 1999, http://citeseerx.ist.psu.edu/viewdoc/summary?doi=10.1.1.42.272, 4 pages.

McGuire, J., et al., "SHADE: Technology for Knowledge-Based Collaborative Engineering," 1993, Journal of Concurrent Engineering: Applications and Research (CERA), 18 pages.

Milward, D., et al., "D2.2: Dynamic Multimodal Interface Reconfiguration," Talk and Look: Tools for Ambient Linguistic Knowledge, Aug. 8, 2006, http://www.ihmc.us/users/nblaylock/Pubs/Files/talk_d2.2.pdf, 69 pages.

Mitra, P., et al., "A Graph-Oriented Model for Articulation of Ontology Interdependencies," 2000, http://ilpubs.stanford.edu:8090/442/1/2000-20.pdf, 15 pages.

Moran, D. B., et al., "Multimodal User Interfaces in the Open Agent Architecture," Proc. of the 1997 International Conference on Intelligent User Interfaces (IUI97), 8 pages.

Mozer, M., "An Intelligent Environment Must be Adaptive," Mar./Apr. 1999, IEEE Intelligent Systems, 3 pages.

Mühlhäuser, M., "Context Aware Voice User Interfaces for Workflow Support," Darmstadt 2007, http://tuprints.ulb.tu-darmstadt.de/876/1/PhD.pdf, 254 pages.

Naone, E., "TR10: Intelligent Software Assistant," Mar.-Apr. 2009, Technology Review, http://www.technologyreview.com/printer_friendly_article.aspx?id=22117, 2 pages.

Neches, R., "Enabling Technology for Knowledge Sharing," Fall 1991, AI Magazine, pp. 37-56, (21 pages).

Nöth, E., et al., "Verbmobil: The Use of Prosody in the Linguistic Components of a Speech Understanding System," IEEE Transactions on Speech and Audio Processing, vol. 8, No. 5, Sep. 2000, 14 pages.

Rice, J., et al., "Monthly Program: Nov. 14, 1995," The San Francisco Bay Area Chapter of ACM SIGCHI, http://www.baychi.org/calendar/19951114/, 2 pages.

Rice, J., et al., "Using the Web Instead of a Window System," Knowledge Systems Laboratory, Stanford University, http://tomgruber.org/writing/ksl-95-69.pdf, 14 pages.

Rivlin, Z., et al., "Maestro: Conductor of Multimedia Analysis Technologies," 1999 SRI International, Communications of the Association for Computing Machinery (CACM), 7 pages.

Sheth, A., et al., "Relationships at the Heart of Semantic Web: Modeling, Discovering, and Exploiting Complex Semantic Relationships," Oct. 13, 2002, Enhancing the Power of the Internet: Studies in Fuzziness and Soft Computing, SpringerVerlag, 38 pages.

Simonite, T., "One Easy Way to Make Siri Smarter," Oct. 18, 2011, Technology Review, http:// www.technologyreview.com/printer_friendly_article.aspx?id=38915, 2 pages.

Stent, A., et al., "The CommandTalk Spoken Dialogue System," 1999, http://acl.ldc.upenn.edu/P/P99/P99-1024.pdf, 8 pages.

Tofel, K., et al., "SpeakTolt: A personal assistant for older iPhones, iPads," Feb. 9, 2012, http://gigaom.com/apple/speaktoit-siri-for-older-iphones-ipads/, 7 pages.

Tucker, J., "Too lazy to grab your TV remote? Use Siri instead," Nov. 30, 2011, http://www.engadget.com/2011/11/30/too-lazy-to-grab-your-tv-remote-use-siri-instead/, 8 pages.

Tur, G., et al., "The CALO Meeting Speech Recognition and Understanding System," 2008, Proc. IEEE Spoken Language Technology Workshop, 4 pages.

Tur, G., et al., "The-CALO-Meeting-Assistant System," IEEE Transactions on Audio, Speech, and Language Processing, vol. 18, No. 6, Aug. 2010, 11 pages.

Vlingo, "Vlingo Launches Voice Enablement Application on Apple App Store," Vlingo press release dated Dec. 3, 2008, 2 pages.

YouTube, "Knowledge Navigator," 5:34 minute video uploaded to YouTube by Knownav on Apr. 29, 2008, http://www.youtube.com/watch?v=QRH8eimU_20on Aug. 3, 2006, 1 page.

YouTube, "Send Text, Listen to and Send E-Mail 'By Voice' www.voiceassist.com," 2:11 minute video uploaded to YouTube by VoiceAssist on Jul. 30, 2009, http://www.youtube.com/watch?v=0tEU61nHHA4, 1 page.

YouTube, "Text'nDrive App Demo—Listen and Reply to your Messages by Voice while Driving!," 1:57 minute video uploaded to YouTube by TextnDrive on Apr. 27, 2010, http://www.youtube.com/watch?v=WaGfzoHsAMw, 1 page.

YouTube, "Voice on the Go (BlackBerry)," 2:51 minute video uploaded to YouTube by VoiceOnTheGo on Jul. 27, 2009, http://www.youtube.com/watch?v=pJqpWgQS98w, 1 page.

International Search Report and Written Opinion dated Nov. 29, 2011, received in International Application No. PCT/US2011/20861, which corresponds to U.S. Appl. No. 12/987,982, 15 pages (Thomas Robert Gruber).

* cited by examiner

Page Character Array

- LINK (A) — 301
- VSPLIT — 310
- LINK (B) — 302
- VSPLIT — 311
- LINK (C) — 303
- VSPLIT — 312
- LINK (D) — 304
- VSPLIT — 313
- LINK (E) — 305
- LINE FEED — 317
- LINK (F) — 306
- VSPLIT — 314
- LINK (G) — 307
- VSPLIT — 315
- LINK (H) — 308
- VSPLIT — 316
- LINK (I) — 309
- LINE FEED — 318
- LINE FEED — 319
- TEXT (L) — 322
- TEXT (I) — 323
- TEXT (N) — 324
- TEXT (K) — 325
- TEXT (S) — 326
- BLANK SPACE — 332
- TEXT (A) — 327
- TEXT (B) — 328
- TEXT (O) — 329
- TEXT (V) — 330
- TEXT (E) — 331
- LINE FEED — 320
- LINE FEED — 321

| User Input | Traverse |
|---|---|
| 1 KEY | LINK (A) |
| 2 KEY | LINK (B) |
| 3 KEY | LINK (C) |
| 4 KEY | LINK (D) |
| 5 KEY | LINK (E) |
| 6 KEY | LINK (F) |
| 7 KEY | LINK (G) |
| 8 KEY | LINK (H) |
| 9 KEY | LINK (I) |

FIG. 7

| User Input | Traverse |
|---|---|
| L T KEYS | LINK (A) |
| R T KEYS | LINK (B) |
| L M KEYS | LINK (C) |
| R M KEYS | LINK (D) |
| L B KEYS | LINK (E) |
| R B KEYS | LINK (F) |

FIG. 17

METHODS AND APPARATUSES FOR DISPLAY AND TRAVERSING OF LINKS IN PAGE CHARACTER ARRAY

CLAIM OF PRIORITY

This application is a continuation of U.S. patent application Ser. No. 10/443,683, filed May 22, 2003, now abandoned, which is a continuation of U.S. patent application Ser. No. 09/374,223, filed Aug. 13, 1999, abandoned.

CROSS REFERENCE TO RELATED PATENT

The following U.S. patent is assigned to the assignee of the present application, and its disclosure is incorporated herein by reference:

U.S. Pat. No. 6,547,830, issued Apr. 15, 2003, by Paul Mercer and entitled, "METHOD AND ARTICLE OF MANUFACTURE FOR MAXIMIZING THE AMOUNT OF TEXT DISPLAYED."

BACKGROUND OF THE INVENTION

1. Field of the Invention

The present invention pertains to the field of browsers for displaying page character arrays, such as HTML web pages, which have link characters representing links to other page character arrays. Specifically, the present invention pertains to the field of small display devices, such as cellular telephones.

2. Discussion of the Related Art

Many devices, such as handheld devices, have relatively small displays for providing information to users. Typically, handheld devices are designed to be mobile, lightweight, and small, which necessitates a relatively small display. A cellular telephone is an example of a handheld device having a small display. The cellular telephone's small display provides only enough space for a few lines of text which may include a name and a telephone number. Large amounts of text are not easily provided on a small display.

Moreover, users of handheld devices may require more information than can be easily provided on a small display. A typical user may want to have information that requires extensive text such as weather forecasts, driving directions, or stock updates. This type of information generally requires numerous lines of text that may not fit on a small display. For example, a user may desire to access an internet page having a variety of fonts identifying links or other usable information. Large amounts of information may be obtained from remote locations, such as servers on the internet, which are accessible by a handheld device, but the amount of information provided to a user is limited by the small display of the handheld device.

The content of internet web pages is specified by page character arrays containing, for example, HTML (HyperText Markup Language) code or another descriptor language's code, such as HDML, WML, SGML, or XML. Any device, such as a browser, attempting to display web pages must be able to interpret the codes in the page character arrays that describe the web pages. A link character is a type of character in page character array describing a web page that represents a pointer to another web page specified by another page character array.

Conventional browsers display link characters in page character arrays as blue underlined text. Groups of links are conventionally constructed of link characters separated by separator bars and/or blank spaces. Conventional browsers make no attempt to optimize the display of groups of links based upon the display size or hardware configuration of the machine running the browser. In other words, aside from underlining the links and coloring them blue, a conventional browser makes no other decisions about how to display a link. Links may be interspersed with text, graphics, and other links; the placement of the link on the display depends upon the surrounding context.

Frequently, web pages include "link bars" which are a series of several links placed adjacently or in close proximity to one another. The links in the link bars are sometimes separated by vertical bars, placed on separate lines, or include blank spaces between them. Conventionally, there is no explicit indication in the page character array that a series of links are associated to one another. As a consequence of this fact, a series of links may be intended to fit on a single line by the author of the web page. However, when the page is accessed by a small screen device, all the links can not fit on a single line due to the limited width of the display. This results in a confusing and visually displeasing result on the small screen device.

Furthermore, conventional browsers make no attempt to provide a mechanism, other than cursor pointing and clicking, by which the user can select a link in a web page so that another web page can be retrieved. Small screen devices, such as cellular phones, typically do not have mouses or cursor pointing and clicking capability.

As is apparent from the above discussion, a need exists for an acceptable and visually pleasing way to display of groups of links for small screen displays. A need also exists for the provision of a link selection mechanism for machines which do not have cursor pointing and clicking capabilities.

SUMMARY OF THE INVENTION

Conventional browsers display link characters in page character arrays as blue underlined text. Groups of links are conventionally constructed of link characters separated by separator bars and/or blank spaces. Conventional browsers make no attempt to optimize the display of groups of links based upon the display size or hardware configuration of the machine running the browser. Conventional browsers make no attempt to provide a mechanism, other than cursor pointing and clicking, by which the user can select a link. An object of the present invention is to optimize the display of groups of links for small screen displays. Another object of the present invention is to provide an efficient link selection mechanism for machines which do not have cursor pointing and clicking capabilities.

According to an aspect of the present invention, a method for processing a page character array finds links and creates link groups containing adjacent link characters. Adjacency of link characters is preferably defined as characters which are separated by any combination of no characters, blank space characters, line feed characters, or separator characters, such as vertical or horizontal separator bars or other separator characters. By filtering out line feeds, links which would conventionally be displayed as vertical link lists are detected and grouped as link groups for optimized display according to the present invention.

Once link groups have been defined, the method lays out each link group for display in an optimized form. In the preferred embodiment of the present invention, links are displayed as buttons. An optimized form of display according to the present invention includes centering all the buttons in a vertical list. Another optimized form of display according to the present invention includes laying out the link group as a rectangular matrix of buttons.

According to another aspect of the present invention, each of the links in a link group is logically mapped to a distinct user input. For example, if a link group consists of nine links, then each of the links is mapped to one of the nine keys 1 through 9. If the link group is currently being displayed, then by pressing any of the keys 1 through 9, the machine traverses the corresponding link. As another example, in a machine with a microphone, each of the links is mapped to a specific voice command. This voice command mapping is alternatively coupled with the keystroke mapping. Thus, the user either presses the 3 key or says the word "three" to instruct the machine to traverse the third link in a link group. The logical mapping of links to a distinct user input provides a mechanism for selecting the link which was not specified by the page character array, but rather which is intelligently instantiated according to the present invention.

The logical mapping aspect and optimized display aspect of the present invention are optionally combined for certain types of hardware. For example, in a cellular telephone having keys 1 through 9 physically configured in a standard three-by-three telephone keypad matrix, the links are laid out on the display screen in a three-by-three rectangular matrix such that the upper left link corresponds to the key 1 and the lower right link corresponds to the key 9. As another example, if keys are physically adjacent to any part of the display, the links are displayed near the keys, or in horizontal and/or vertical alignment with the keys, so that the key to which a link is mapped is apparent from its position on the display screen. As yet another example, the name of key or command to which a link is mapped is displayed within or beside the button containing the name of the link; thus, additional information not specified in the page character array is interjected into the display according to the present invention to facilitate link selection.

These and other features, aspects, and advantages of the present invention are fully described in the Detailed Description of the Invention, which discusses the Figures in narrative form.

BRIEF DESCRIPTION OF THE DRAWINGS

FIG. 3 illustrates a page character array used as input to the methods according to the present invention.

FIG. 7 illustrates an input device to link correspondence table generated by a method according to the present invention shown in FIGS. 5 and 15 for the page character array shown in FIG. 3 and the display screen appearance shown in FIG. 6.

FIG. 17 illustrates an input device to link correspondence table generated by a method according to the present invention shown in FIGS. 5 and 15 for the page character array shown in FIG. 3 and the display screen appearance shown in FIG. 16.

The Figures are more fully described in narrative form in the Detailed Description of the Invention. In the Figures, like method steps are labeled with like reference numerals.

DETAILED DESCRIPTION OF THE INVENTION

Figure 1A:
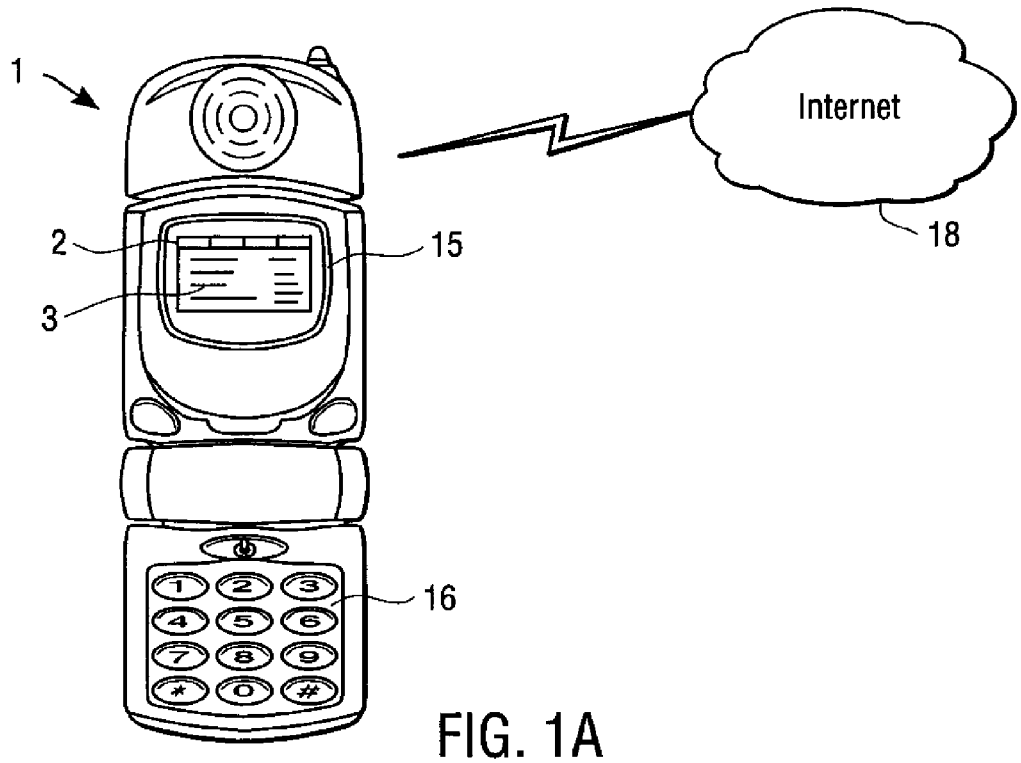
FIG. 1A illustrates a cellular telephone having software according to an embodiment of the present invention.

FIG. 1A illustrates a device having a small display according to an embodiment of the present invention. In an embodiment, the device may be a handheld device. In particular, FIG. 1A illustrates a cellular telephone 1 having a small display 15. Cellular telephone 1 also includes input device 16 and, in particular, a numeric keypad. Display 15 provides a window 2 having text 3 according to an embodiment of the present invention. An expanded view of window 2 and text 3 is illustrated in FIG. 3 and described below. Cellular telephone 1 has wireless access to the world-wide-web ("www") or internet 18 and/or may optionally be connected to other data networks such as the Wireless Access Protocol ("WAP").

While a cellular telephone embodiment of the present invention is illustrated in FIG. 1A, one of ordinary skill in the art would appreciate that many other embodiments of the present invention fall within the scope of the appended claims. For example, embodiments of the present invention may include pagers, palm top computers, personal digital assistants ("PDA"), digital video device ("DVD") players, digital cameras, printers, or an equivalent thereof. Generally, an embodiment of the present invention may include any information appliance. An information appliance is any mobile device that is designed to provide users with access to information stored on the device, or to information stored elsewhere when connected to data resources via a wired or wireless connection.

According to embodiments of the present invention, cellular telephone 1, supports wireless protocol communications, including the Global System for Mobile communications ("GSM"), Time Division Multiple Access ("TDMA"), Personal Digital Cellular ("PDC"), Code Division Multiple Access ("CDMA"), W-CDMA, or CDMA-2000.

Figure 1B:
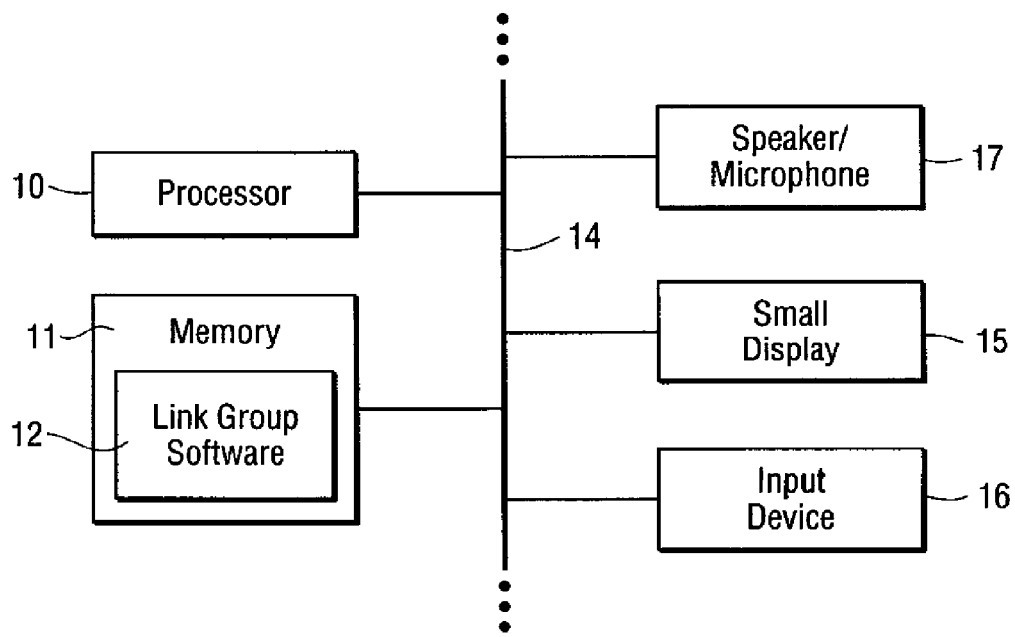
FIG. 1B illustrates a block diagram of a device according to an embodiment of the present invention.

FIG. 1B illustrates a hardware/software block diagram according to an embodiment of the present invention. A device 17 according to an embodiment of the present invention includes an electronics bus 14 for electrically coupling various device components. Ellipses are shown to identify other software and hardware components that may be present in an embodiment of the present invention. For example, device 17 may be a cellular telephone which has communication software and wireless communication hardware.

Processor 10 is coupled to bus 14. In an embodiment, processor 10 may be an embedded microprocessor such as a Sharp® Microelectronics ARM7 processor, a low power 32 bit reduced instruction set computer ("RISC") processor. In another embodiment, processor 10 may be a Motorola® 68K Dragonball microprocessor. In alternate embodiments, processor 10 may be a Power PC, MIPS, or X86 processor.

Memory 11 is also coupled to bus 14 and stores link group software 12 according to an embodiment of the present invention. In an alternate embodiment, link group software 12 may be stored on persistent storage device such as a magnetic hard disk, a floppy magnetic disk, CD-ROM or other write data storage technology, singly or in combination. Memory 11 can include read-only-memory ("ROM"), ready-access-memory ("RAM"), virtual memory or other memory technology, singly or in combination. In an embodiment, memory 11 is an approximately 50K ROM.

Speaker/microphone 17 is also coupled to bus 14 and is used as an audio input/output device in an embodiment of the present invention. Input device 16 is coupled to bus 14. In an embodiment, input device 16 may be a numeric keypad or a touch sensitive screen. Small display 15 is also coupled to bus 14. In an embodiment, small display 15 may be a bit map display having a pixel size of 80×60. In alternate embodiments, the small display 15 may have a pixel size up to and including 128×64, 160×240, or 320×240.

Figure 2:
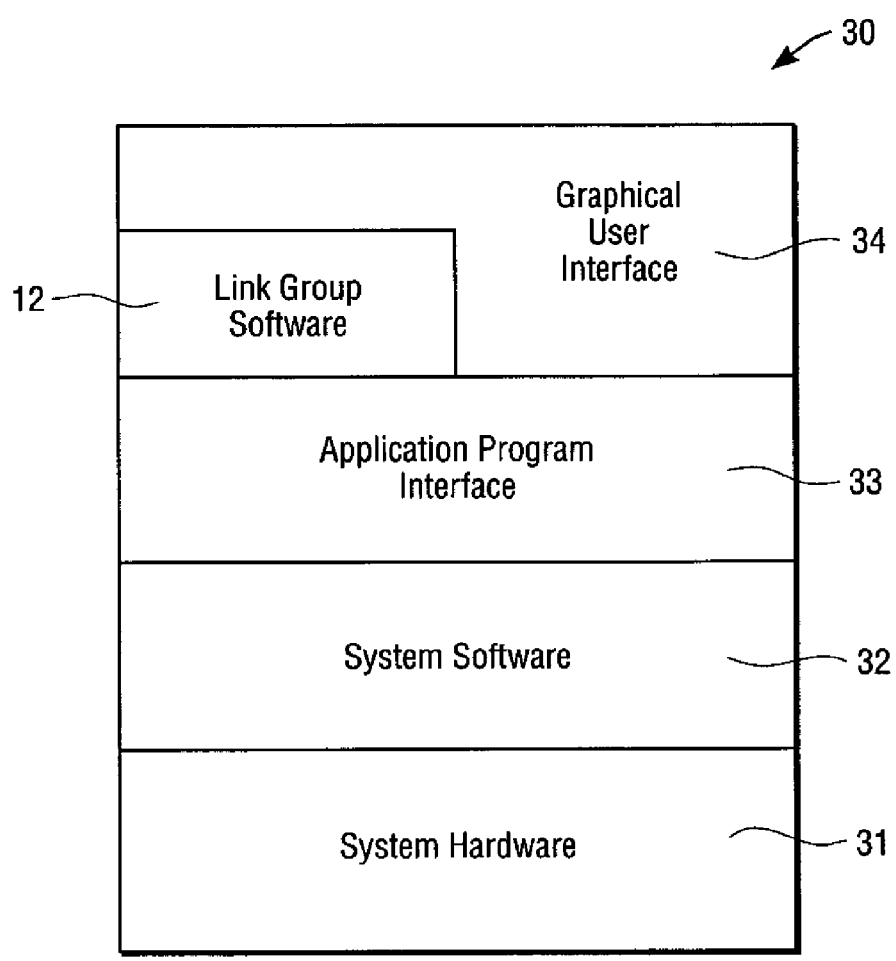
FIG. 2 illustrates a software and hardware block layer diagram according to an embodiment of the present invention.

FIG. 2 illustrates a software and hardware block layer diagram 30 according to an embodiment of the present invention. System software 32 and system hardware 31 are used in connection with application program interface 33 to support a graphical user interface 34 according to an embodiment of the present invention.

System software 32 may include a real time operating system software for controlling internal operation of device 17. System software 32 may also include a web browser for accessing internet 18 over a wired or wireless connection.

In an embodiment, graphical user interface 34 is used to provide information and/or text to display 15 on cellular telephone 1 illustrated in FIG. 1A. Link group software 12 is used in connection with graphical user interface software 34 to provide link group information to a small display 15. In an embodiment, link group software 12 is able to map a hypertext markup language ("HTML") page from internet 18 to small display 15 by using link group software 12 which is described below.

FIG. 3 illustrates a page character array 300 used as input to the method according to the present invention. The characters 301 through 309 are link characters representing links to page character arrays named A through I, respectively. Characters 310 through 316 represent vertical splitter bars. Characters 317 through 321 represent line feed characters, which are logically equivalent to carriage return characters. Characters 322 through 331 represent text characters. Character 332 represents a blank space.

For the purposes of explanation of the present invention, the term "character" refers to a token of the document encoding standard, for example ASCII, UNICODE, HTML, and XML. In other words, a "character" is any string or code that has some defined significance. A link character represents an actionable token, such as retrieving another page character array, or executing an arbitrary computer function such as playing a sound, or initiating a computer transaction. A blank space or line feed character refers to any token which creates white space or a sequence of codes that result in blank space.

Figure 4:
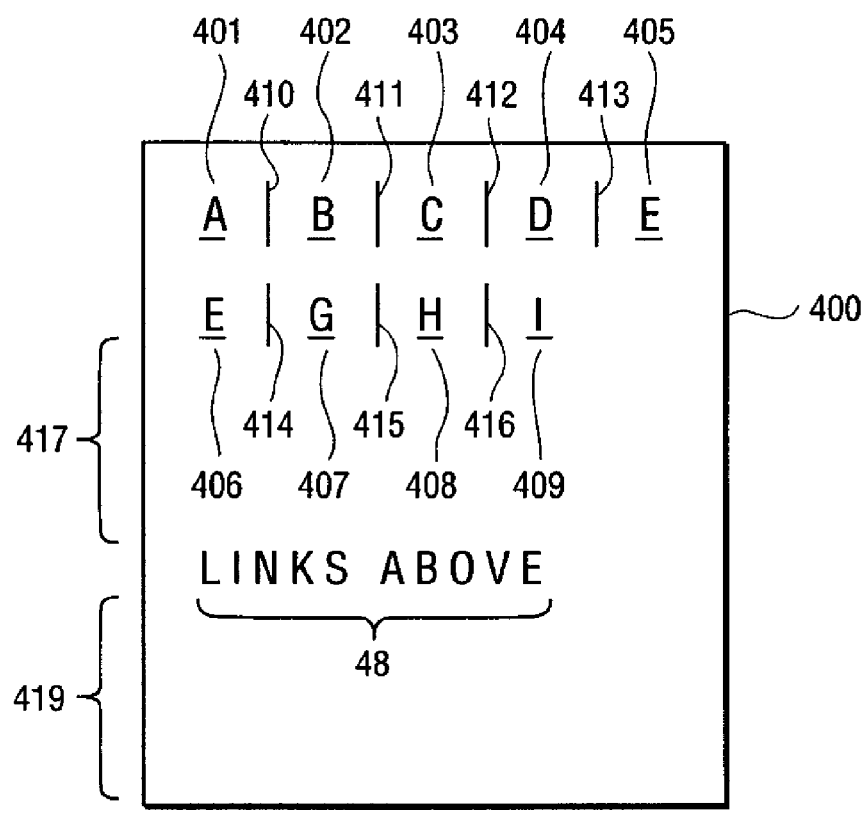
FIG. 4 illustrates a conventional browser's display screen appearance after displaying the page character array shown in FIG. 3.

FIG. 4 illustrates a conventional browser's display screen appearance after displaying the page character array 300 shown in FIG. 3. Specifically, a conventional browser displays links A through I as blue underlined text 401 through 409 which correspond to link characters 301 through 309, respectively, shown in FIG. 3. Vertical splitter bars 410 through 416 illustrated in FIG. 4 are displayed by a conventional browser as a result of interpretation of vertical splitter characters 310 through 316 shown in FIG. 3. The links F, G, H, and I, appear on a lower line than the links A, B, C, D, and E because line feed character 317 advances the display to the subsequent line. Blank space 417 illustrated in FIG. 4 is a result of the conventional browser's interpretation of line feed characters 318 and 319. The text 418 illustrated in FIG. 4 is a result of the conventional browser's interpretation of text characters 322 through 332. Blank space 419 is a result of the conventional browser's interpretation of line feed characters 320 and 321 shown in FIG. 3. As is clearly illustrated by FIG. 3, the page character array 300 contains no explicit specification that links A through I are related to each other or are to be displayed in any particular specialized manner because they are related links.

Figure 5:
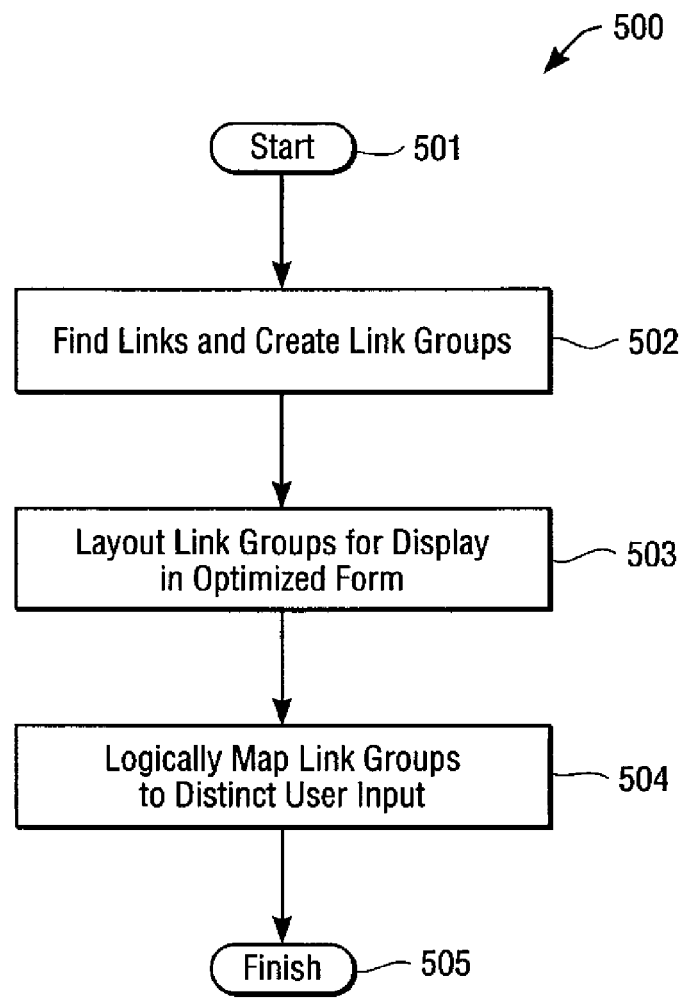
FIG. 5 illustrates a method of processing a page character array according to the present invention.

FIG. 5 illustrates a method 500 of processing a page character array according to the present invention. The method starts with step 501. At step 502, the method finds links and creates link groups (or in other words hyperlink groupings). As will be discussed later, link groups consist of adjacent link characters within the page character array. At step 503, the method lays out the link groups created in step 502 for display in an optimized form. At step 504, link groups created in step 502 are logically mapped to a distinct user input, such as the touching of a specific key, or the receipt of a specific voice command. The method 500 is finished at step 505. It is to be noted that steps 503 and 504 are alternatively optional according to the present invention. In other words, after the link groups are created in step 502, either an optimized display can be generated according to the present invention in step 503 or a logical mapping of the link groups to a distinct user input can be performed by step 504. Thus, in alternative embodiments, either step 503 or step 504 is omitted according to the present invention. In the preferred embodiment, however, both steps 503 and 504 are performed according to the present invention.

Figure 6:
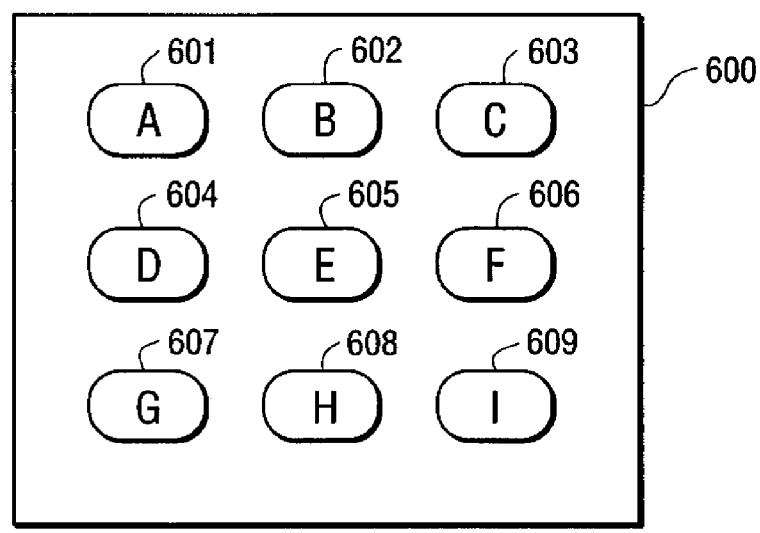
FIG. 6 illustrates a display screen appearance after displaying the page character array shown in FIG. 3 using a method according to the present invention shown in FIGS. 5 and 13.
Figure 13:
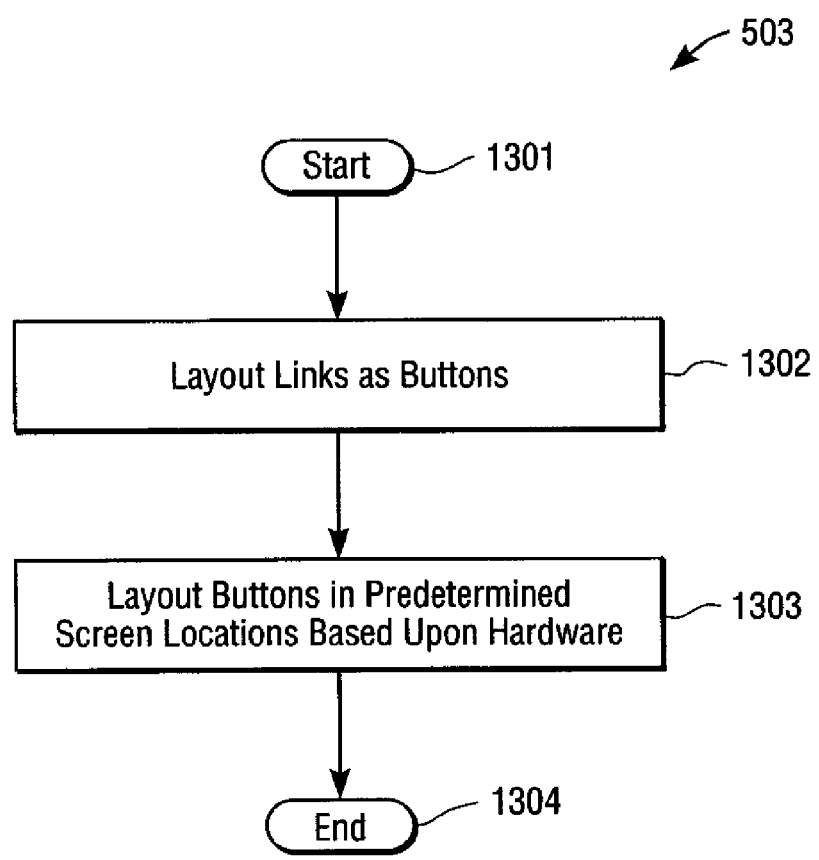
FIG. 13 illustrates a method of implementing the step shown in FIG. 5 of laying out link groups for a display screen in an optimized form according to the present invention.

FIG. 6 illustrates a display screen appearance 600 after displaying the page character array shown in FIG. 3 using a method according to the present invention shown in FIGS. 5 and 13. Buttons 601 through 609 are a result of the interpretation of link characters 301 through 309 by the method according to the present invention. The display screen appearance 600 illustrated in FIG. 6 represents one possible optimized screen display corresponding to a nine link group detected in step 502 and displayed in step 503 as the display screen appearance 600. There are many other possible screen layouts which may be created in alternative to display screen appearance 600, as will be described below, according to the present invention.

Figure 15:
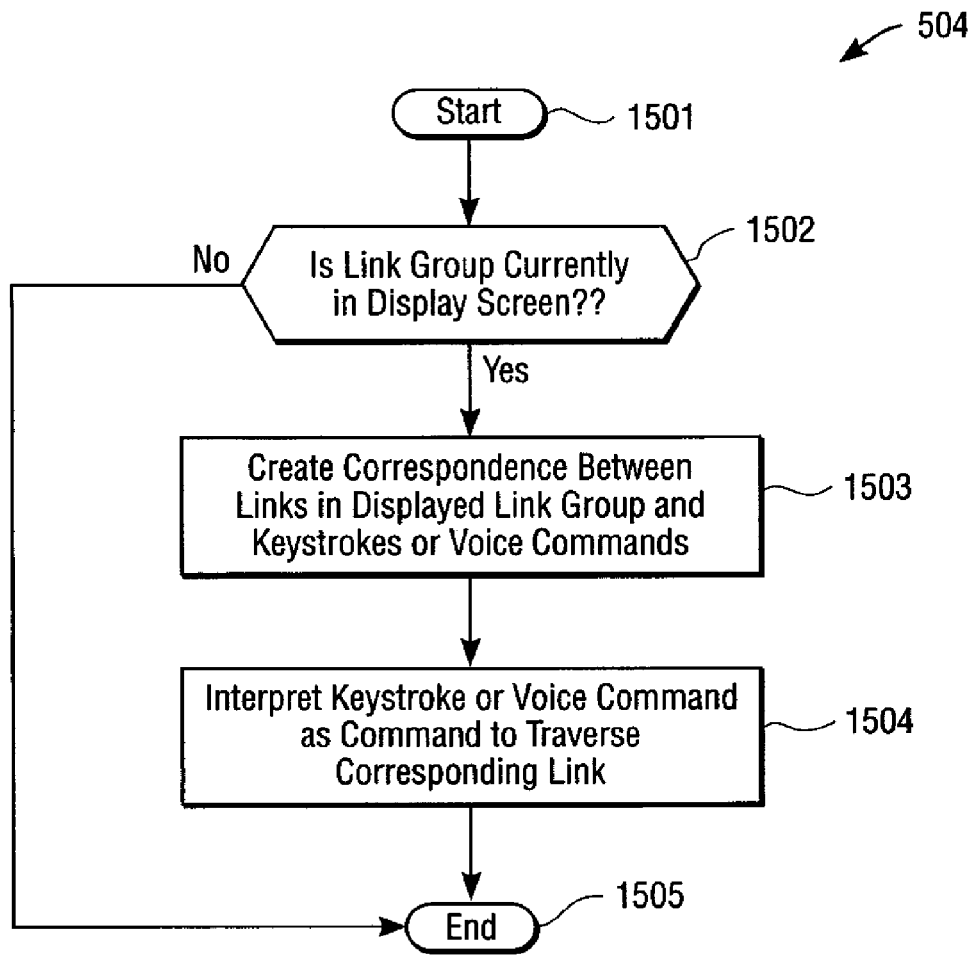
FIG. 15 illustrates a method of implementing the step shown in FIG. 5 of logically mapping link groups to the distinct user input according to the present invention.

FIG. 7 illustrates an input device to link correspondence table 700 generated by a method according to the present invention shown in FIGS. 5 and 15 for the page character array 300 shown in FIG. 3 and the display screen appearance 600 shown in FIG. 6. As will be described below, step 504 logically maps each of the keys 1 through 9 to a corresponding one of the links A through I, as illustrated in Table 700. Thus, when the user strikes one of the keys 1 through 9 while the link group containing links A through I is in the display screen, the link corresponding to the key pressed will be traversed by the method according to the present invention.

Figure 8:
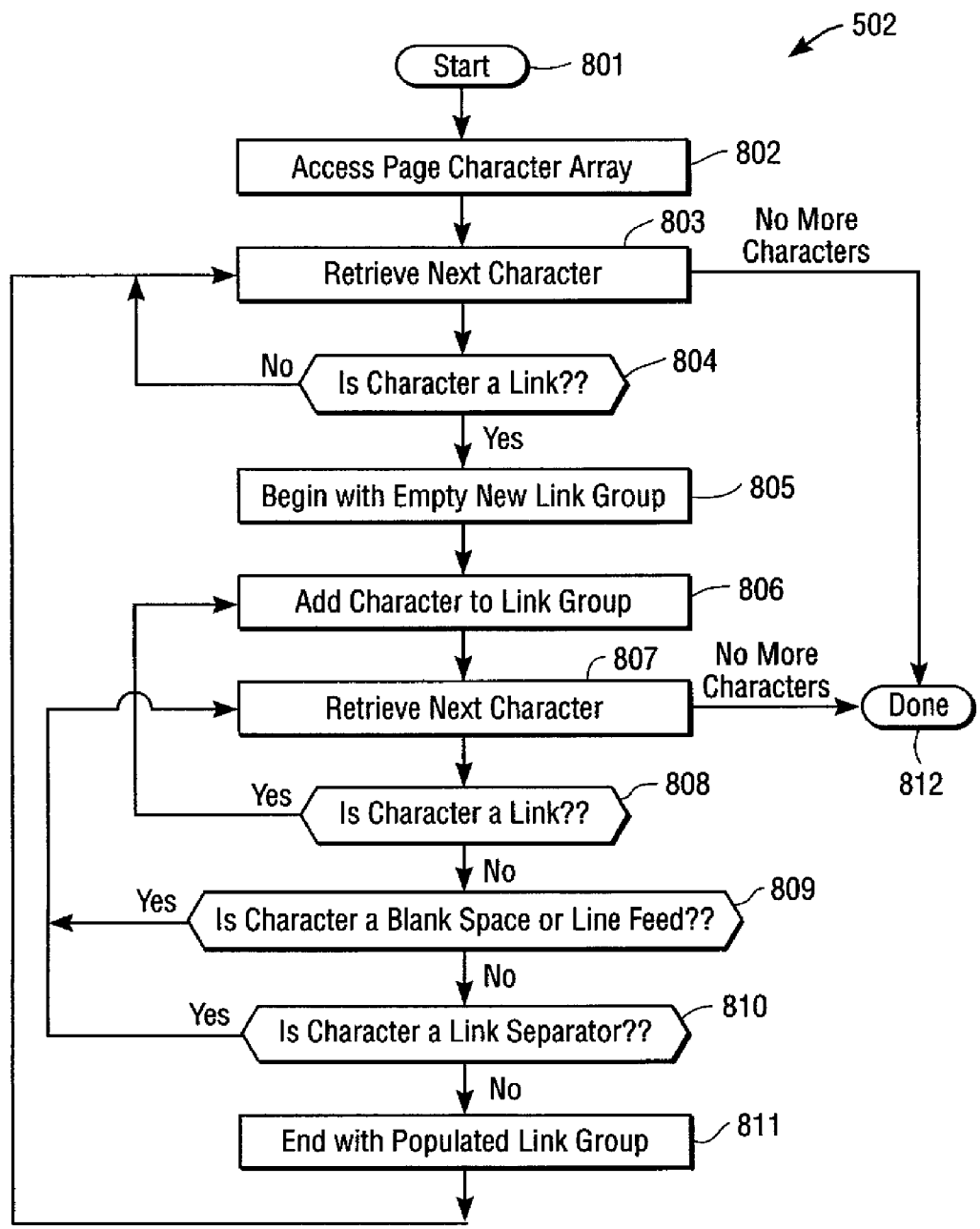
FIG. 8 illustrates a method of implementing the step shown in FIG. 5 of finding links and creating link groups according to the present invention.

FIG. 8 illustrates a method of implementing the step shown in FIG. 5 of finding links and creating link groups according to the present invention. Thus, the method 502 illustrated in FIG. 8 is an exploded view of the method step 502 shown in FIG. 5 and represents the presently preferred embodiment for executing the step 502 shown in FIG. 5. However, it is to be understood that various additions and modifications to the method 502 shown in FIG. 8 can be alternatively implemented without departing from the spirit and scope of the present invention. The method starts at step 801 and at step 802 the page character array is accessed. The next character is retrieved from the page character array at step 803. Test 804 determines if the character retrieved in step 803 is a link. In several page character array description languages, such as HTML, there are several alternative characters which represent links. Test 804 detects all such link characters. If the character retrieved in step 803 is a link, then the method 502 opens a new empty link group at step 805. At step 806, the character previously determined by step 804 to be a link is added to the new link group created in step 805. The next character in the page character array is then retrieved at step 807. Test 808 determines if the character retrieved by step 807 is a link. If the character is a link then the method reverts to step 806 and that link is added to the current link group which was previously created in step 805. If the character retrieved in step 807 is not a link, then test 809 determines if the character is a blank space or line feed character. If the character retrieved in step 807 is a blank space or line feed, then the method 502 essentially filters it out of the page character array by advancing back to step 807 to retrieve the next subsequent character. If the character is not a blank space or line feed, then step 810 determines if the character is a link separator character. Link separator characters are alternatively any one of vertical splitter characters, horizontal splitter characters, or other arbitrary characters, such as a plus or minus sign, which are used to separate link characters. If the character is determined to be a link separator by step 810, it is also essentially filtered out by the method 502 because the method then reverts back to step 807 to retrieve the next subsequent character. However, if the character is not a link separator, then the link group opened in step 805 is closed at step 811. The method then reverts to step 803 to retrieve the next character in the page character array. If at any point steps 803 or 807 do not detect any more characters in the page character array, then the method is done at step 812 as the page character array has been fully parsed.

Figure 9:
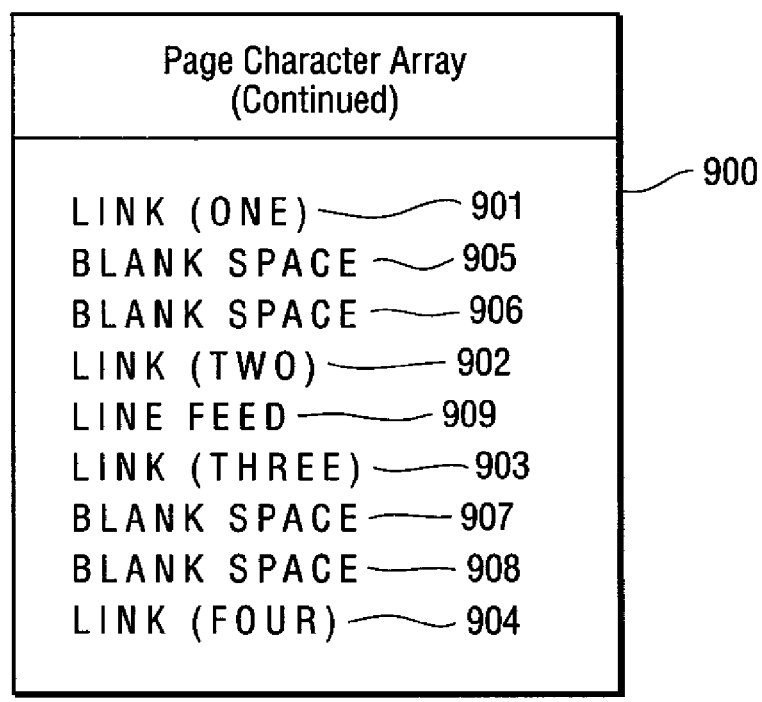
FIG. 9 illustrates a continuation of the page character array shown in FIG. 3 used as input to the methods according to the present invention.

FIG. 9 illustrates a continuation of the page character array 300 shown in FIG. 3 used as input to the methods according to the present invention. Characters 901 through 904 represent links, characters 905 through 908 represent blank spaces, and character 909 represents a line feed or carriage return.

Figure 10A:
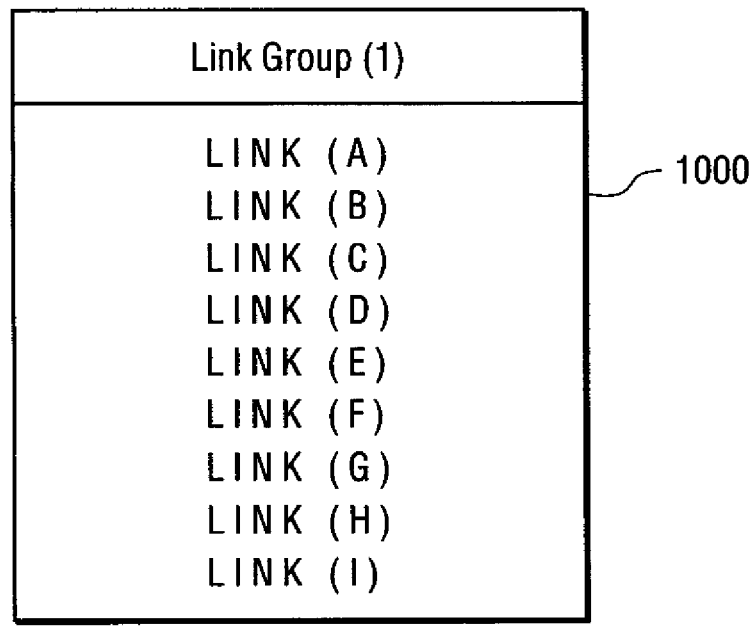
FIG. 10A illustrates a link group extracted from the page character array shown in FIG. 3 by a method according to the present invention shown in FIG. 8.

FIG. 10A illustrates a link group extracted from the page character array 300 shown in FIG. 3 by a method 502 according to the present invention shown in FIG. 8. Specifically, all of the link characters 301 through 309 illustrated in FIG. 3 have been grouped into a first link group 1000 containing only the characters representing the links. The vertical splitter characters 310 through 316 as well as the line feed character 317 shown in FIG. 3 have been filtered out by the method 502.

Figure 10B:
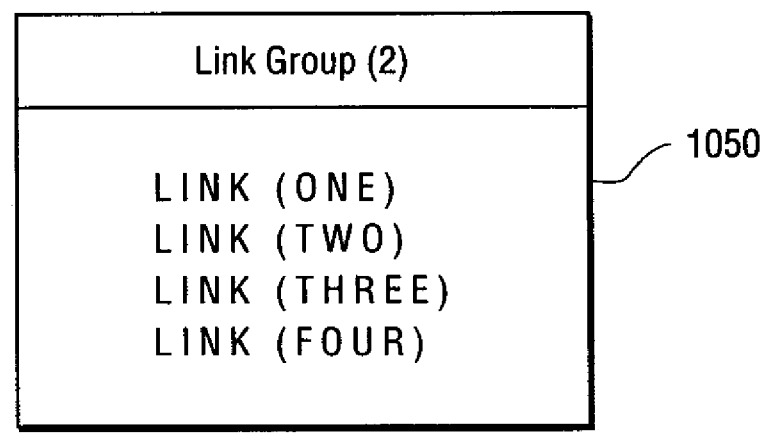
FIG. 10B illustrates another link group extracted from the page character array shown in FIGS. 3 and 9 by a method according to the present invention shown in FIG. 8.

FIG. 10B illustrates another link group 1050 extracted from the page character array 900 shown in FIGS. 3 and 9 by a method 502 according to the present invention shown in FIG. 8. Specifically, link characters 901 through 904 have been grouped into a second link group 1050 by the method 502. Blank space characters 905-908 have been filtered out, along with line feed character 909.

Figure 11:
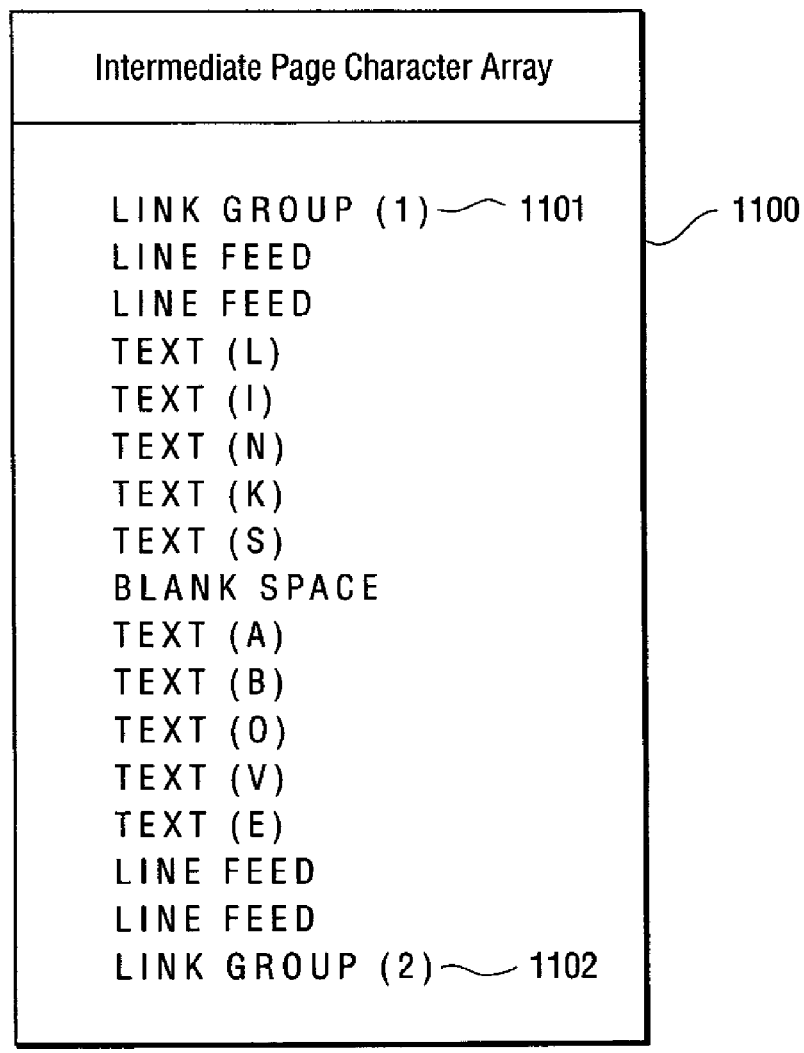
FIG. 11 illustrates an intermediate page character array generated from the page character array shown in FIGS. 3 and 9 by a method according to the present invention shown in FIG. 8.

FIG. 11 illustrates an intermediate page character array 1100 generated from the page character array shown in FIGS. 3 and 9 by a method 502 according to the present invention and shown in FIG. 8. Specifically, the method 502 has detected the first link group 1000 and second link group 1050 and replaced them with characters 1101 and 1102 representing pointers to the link groups 1000 and 1050, respectively. The remaining characters and the intermediate page character array 1100 represent characters from the page character array 300 which were not grouped into a link group.

Figure 12:
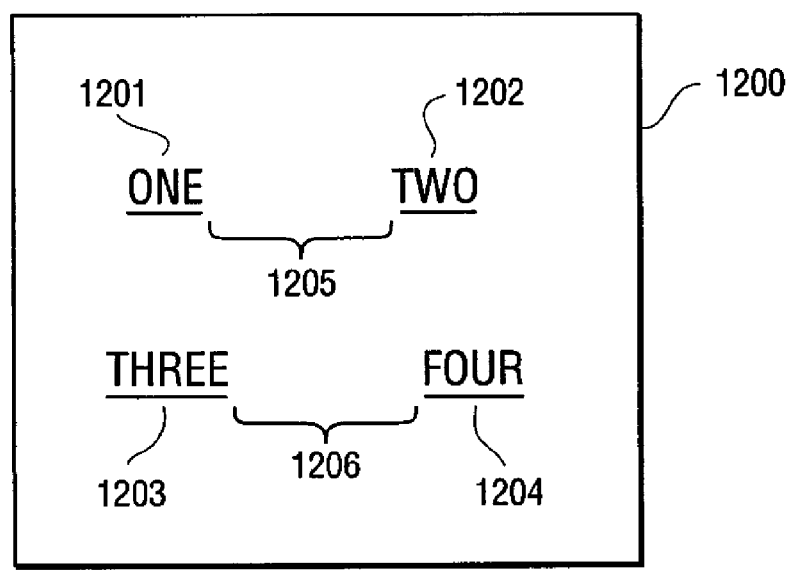
FIG. 12 illustrates a conventional browser's display screen appearance after displaying the page character array shown in FIG. 9.

FIG. 12 illustrates a conventional browser's display screen appearance 1200 after displaying the page character array 900 shown in FIG. 9. Link characters 901 through 904 are interpreted by a conventional browser and displayed as blue underlined text 1201 through 1204, respectively. Blank space characters 905 and 906 are interpreted by a conventional browser and create the space 1205 illustrated in FIG. 12. Similarly, blank space characters 907 and 908 correspond to space 1206 illustrated in FIG. 12. Line feed character 909 is interpreted by a conventional browser to place the subsequent characters on a lower line, which creates the two-line appearance 1200 illustrated in FIG. 12.

FIG. 13 illustrates a method of implementing the step 503 shown in FIG. 5 of laying out link groups for a display screen in an optimized form according to the present invention. The method starts at step 1301. At step 1302, link characters are laid out as buttons, such as illustrated in FIG. 6. A button is preferably enclosed by a circular or oval shaped boundary. At step 1303, the method 503 lays out the buttons in predetermined screen locations based upon the hardware upon which the method is executing. The method is completed at step 1304. Thus, FIG. 13 illustrates the method of implementing step 503 shown in FIG. 5, and is therefore an exploded view of the steps required to implement step 503 shown in FIG. 5.

Figure 14:
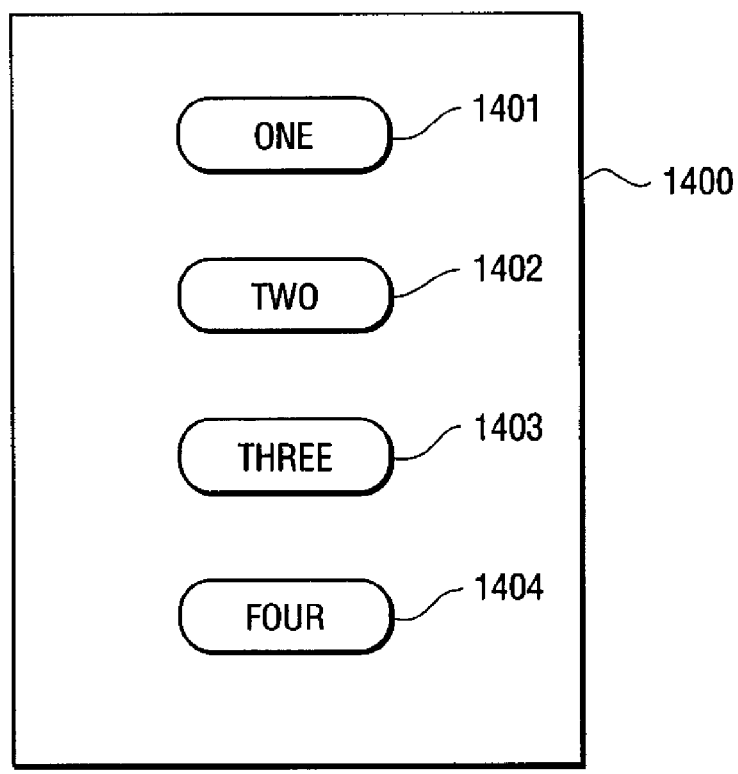
FIG. 14 illustrates a display screen appearance after displaying the page character array shown in FIG. 9 using a method according to the present invention shown in FIGS. 5 and 13.

FIG. 14 illustrates a display screen appearance 1400 after displaying the page character array 900 shown in FIG. 9 using a method 502 according to the present invention shown in FIGS. 5 and 13. In the screen display appearance 1400, buttons 1401 through 1402 correspond to characters 901 through 904 shown in FIG. 9. In the display screen appearance 1400, buttons 1400 through 1404 are horizontally centered in a vertical list. This horizontal centering represents an embodiment of an optimized form of display of a link group according to the present invention.

FIG. 15 illustrates a method 504 of implementing the step shown in FIG. 5 of logically mapping link groups to distinct user input according to the present invention. The method starts at step 1501. Test 1502 determines if a link group is currently in the display screen. If the link group is not currently in the display screen, then the method ends at step 1505. In other words, no action is taken by step 504 in the event that a link group is not currently being displayed in the display screen. Step 1303 illustrated in FIG. 13 lays out the buttons in a predetermined screen location based upon a hardware in a logical frame buffer. Only a portion of the logical frame buffer is actually displayed at any given time. If the link group is in the portion of the screen layout which is in the display screen, then step 1503 creates a correspondence between the links and the displayed link group and key strokes or voice commands. This is illustrated, for example, by the Table 700 shown in FIG. 7. At step 1504, the machine interprets key strokes or voice commands as a command to traverse the corresponding link. If a link group is not currently in the display screen, then key strokes or voice commands are not interpreted as link invocations.

Figure 16:
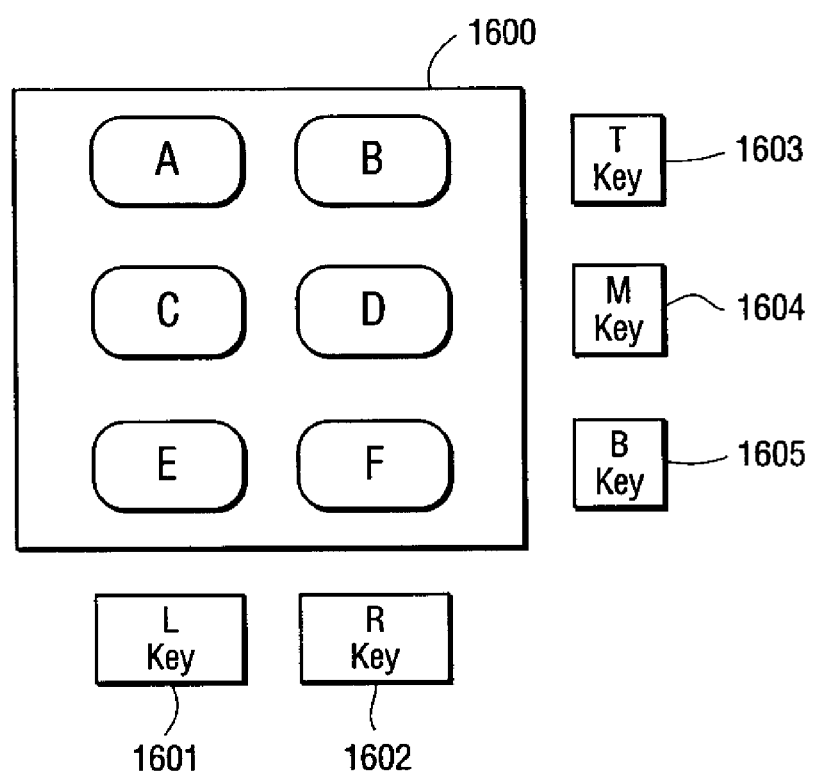
FIG. 16 illustrates a display screen appearance in relation to input device keys after displaying the page character array shown in FIG. 3 using a method according to the present invention shown in FIGS. 5 and 13.

FIG. 16 illustrates a display screen appearance 1600 in relation to input device keys 1601 through 1605 after displaying the page character array 300 shown in FIG. 3 using a method 500 according to the present invention shown in FIGS. 5 and 13. The links A through F shown in FIG. 16 are selected by the user by pressing one of the L or R keys 1601 or 1602 and one of the T, M, or B keys 1603 through 1605. For example, link A is traversed by pressing the L key 1601 and the T key 1603. The F link is traversed by pressing the R key 1602 and the B key 1605. In the example shown in FIG. 16, links are laid out in optimized form by step 503 so as to be vertically and horizontally aligned with the input keys to which they are logically mapped by step 504. Another example of the combination of steps 503 and 504 is found in FIG. 6, where links A through I are laid out so as to physically correspond to numbers 1 through 9 on a standard telephonic keypad.

FIG. 17 illustrates an input device to link correspondence table 1700 generated by a method 504 according to the present invention shown in FIGS. 5 and 15 for the page character array 300 shown in FIG. 3 and the display screen appearance shown in FIG. 16. Specifically, each of the links is mapped to a unique combination of the keys 1601 through 1605.

Figure 18:
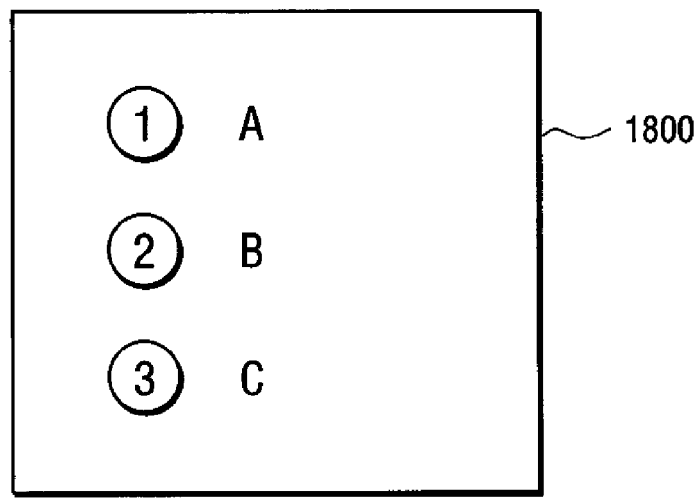
FIG. 18 illustrates a display screen appearance after displaying the page character array shown in FIG. 3 using a method according to the present invention shown in FIGS. 5 and 15.

FIG. 18 illustrates a display screen appearance 1800 after displaying the page character array 300 shown in FIG. 3 using a method according to the present invention shown in FIGS. 5 and 15. In FIG. 18, the keys to which links A, B, and C are logically mapped by step 504 are actually displayed alongside the link names. In this respect, the present invention optionally displays in step 503 an indication of the physical key to which the link is mapped in step 504. Thus, link C is selected by pressing the 3 key as shown in the screen display appearance 1800. Alternatively to the above-described laying out of the indication of the corresponding mapped keystroke along with each link name for each link in the link group illustrated in FIG. 18, the indication of the corresponding mapped keystroke is laid out as a small captioned box next to or above the layout of the link (not unlike a footnote) to indicate the mapping relationship.

As shown in FIGS. 16 and 18, only a portion of the entire first link group is displayed on the display screen. Specifically, in FIG. 16, links G, H, and I could not fit on the display screen 1600, and in FIG. 18, links D through I could not fit on the display screen 1800. As the user scrolls down so that the remaining links become visible and the first few links in the link group are not visible, the method 504 optionally creates a different mapping of the input keys to the links in the link group, or optionally maintains the same correspondence between input keys and links. In the example shown in FIG. 16, it is anticipated that as links G, H, and I become visible, the mapping of the T, M, and B keys 1603 through 1605 is altered so that horizontal alignment is maintained. If the user scrolls down so that links G and H are visible but links A and B are not visible, then links A and B are no longer selectable by the user. However, in the example shown in FIG. 18, as the user scrolls down such that links D, E, and F are visible instead of links A, B, and C, then the method 504 according to the present invention preferably maintains the mapping of keys 4, 5, and 6 to links D, E, and F, and therefore links A, B, and C are still selectable by the user by depressing the appropriate keys even though they are no longer visible on the display screen.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A mobile device having a display screen, comprising:
a processor; and
a processor readable storage medium having processor readable program code embodied in said processor readable storage medium, said processor readable program code for programming the device to:
find links within a page character array and filter out of the page character array characters which are not links;
create one or more link groups each having a plurality of links;
lay out each link group for display in optimum form on the display screen of the mobile device at predetermined display screen locations based upon hardware of the mobile device, wherein the predetermined screen locations correspond to discrete user locations;
display on the display screen of the mobile device a first portion of the link group layout, wherein the first portion does not include all links of the link group;
logically map each of the displayed links of the first portion of the link group to a distinct user input, in which correspondence between links in the link group and keystrokes or voice commands is created;
alter the display of the link groups to display a second portion of the link group layout; and
logically map each of the displayed links of the second portion of the link group to a distinct user input;
wherein the mapping of each of the displayed links of the second portion of the link group does not alter the mapping of the first portion of the link group such that the mapping of links of the first and the second portions of the link group are maintained concurrently.

2. A mobile device as in claim 1, wherein adjacent link characters comprise link characters separated in the page character array by any combination of: no other characters, blank space characters, line feed characters, and link separator characters.

3. A mobile device as in claim 1, wherein the program code lays out links as buttons.

4. A mobile device as in claim 1, wherein the program code centers links in a vertical list.

5. A mobile device as in claim 1, wherein the program code lays out links in a rectangular matrix.

6. A mobile device as in claim 1, wherein the program code lays out an indication of a corresponding mapped keystroke along with each link name for each link in the link group.

7. A method comprising:
finding links within a page character array and filter out of the page character array characters which are not links;
creating one or more link groups each having a plurality of links;
laying out each link group for display in optimum form on the display screen of the mobile device at predetermined display screen locations based upon hardware of the mobile device, wherein the predetermined screen locations correspond to discrete user locations;
displaying on the display screen of the mobile device a first portion of the link group layout, wherein the first portion does not include all links of the link group;
logically mapping, using one or more processors, each of the displayed links of the first portion of the link group to a distinct user input, in which correspondence between links in the link group and keystrokes or voice commands is created;
altering the display of the link groups to display a second portion of the link group layout; and
logically mapping each of the displayed links of the second portion of the link group to a distinct user input,
wherein the mapping of each of the displayed links of the second portion of the link group does not alter the mapping of the first portion of the link group such that the mapping of links of the first and the second portions of the link group are maintained concurrently.

8. The method of claim 7, wherein adjacent link characters comprise link characters separated in the page character array by any combination of: no other characters, blank space characters, line feed characters, and link separator characters.

9. The method of claim 7, wherein laying out each link group for display includes laying out links as buttons.

10. The method of claim 7, wherein laying out each link group for display includes laying out links as centered in a vertical list.

11. The method of claim 7, wherein laying out each link group for display includes laying out links in a rectangular matrix.

12. The method of claim 7, further comprising:
laying out an indication of a corresponding mapped keystroke along with each link name for each link in the link group.

13. A processor readable storage medium having processor readable program code embodied in the processor readable storage medium, the processor readable program code for programming the device to:
find links within a page character array and filter out of the page character array characters which are not links;
create one or more link groups each having a plurality of links;
lay out each link group for display in optimum form on the display screen of the mobile device at predetermined display screen locations based upon hardware of the mobile device, wherein the predetermined screen locations correspond to discrete user locations;
display on the display screen of the mobile device a first portion of the link group layout, wherein the first portion does not include all links of the link group;
logically map each of the displayed links of the first portion of the link group to a distinct user input, in which correspondence between links in the link group and keystrokes or voice commands is created;
alter the display of the link groups to display a second portion of the link group layout; and
logically map each of the displayed links of the second portion of the link group to a distinct user input;
wherein the mapping of each of the displayed links of the second portion of the link group does not alter the mapping of the first portion of the link group such that the mapping of links of the first and the second portions of the link group are maintained concurrently.

* * * * *

UNITED STATES PATENT AND TRADEMARK OFFICE
CERTIFICATE OF CORRECTION

PATENT NO. : 8,527,861 B2  
APPLICATION NO. : 11/735293  
DATED : September 3, 2013  
INVENTOR(S) : Paul Mercer It is certified that error appears in the above-identified patent and that said Letters Patent is hereby corrected as shown below:

On the Title page, item (63), line 3, please delete "09/734,223" and insert -- 09/374,223 --.

Signed and Sealed this  
Twenty-sixth Day of November, 2013

Margaret A. Focarino  
*Commissioner for Patents of the United States Patent and Trademark Office*